United States Patent
Takeuchi

(10) Patent No.: US 9,288,399 B2
(45) Date of Patent: Mar. 15, 2016

(54) IMAGE PROCESSING APPARATUS, IMAGE PROCESSING METHOD, AND PROGRAM

(75) Inventor: Satoru Takeuchi, Chiba (JP)

(73) Assignee: Sony Corporation, Tokyo (JP)

( * ) Notice: Subject to any disclaimer, the term of this patent is extended or adjusted under 35 U.S.C. 154(b) by 72 days.

(21) Appl. No.: 13/565,202

(22) Filed: Aug. 2, 2012

(65) Prior Publication Data

US 2013/0050520 A1    Feb. 28, 2013

(30) Foreign Application Priority Data

Aug. 31, 2011  (JP) ................. 2011-190051
Dec. 29, 2011  (JP) ................. 2011-290257

(51) Int. Cl.
H04N 5/228    (2006.01)
H04N 5/235    (2006.01)
H04N 5/353    (2011.01)
H04N 5/355    (2011.01)

(52) U.S. Cl.
CPC ........... *H04N 5/2353* (2013.01); *H04N 5/2355* (2013.01); *H04N 5/3535* (2013.01); *H04N 5/35563* (2013.01)

(58) Field of Classification Search
CPC . H04N 5/2353; H04N 5/2355; H04N 5/3535; H04N 5/35563; G06T 5/007–5/009; G06T 2007/20208; G06T 2207/20221; H05N 5/33527–3/35527
USPC .................................................... 348/222.1
See application file for complete search history.

(56) References Cited

U.S. PATENT DOCUMENTS

| | | | | |
|---|---|---|---|---|
| 7,511,739 | B2 * | 3/2009 | Tsujino | 348/229.1 |
| 2003/0142745 | A1 * | 7/2003 | Osawa | 375/240.03 |
| 2006/0177148 | A1 * | 8/2006 | Sumiya et al. | 382/274 |
| 2008/0143841 | A1 * | 6/2008 | Tico et al. | 348/208.99 |
| 2010/0053346 | A1 * | 3/2010 | Mitsunaga | 348/208.6 |
| 2010/0053349 | A1 * | 3/2010 | Watanabe et al. | 348/222.1 |
| 2011/0176028 | A1 * | 7/2011 | Toyoda | 348/223.1 |
| 2011/0317028 | A1 * | 12/2011 | Shinmei et al. | 348/223.1 |
| 2013/0050520 | A1 * | 2/2013 | Takeuchi | 348/222.1 |

FOREIGN PATENT DOCUMENTS

| | | |
|---|---|---|
| JP | 2000-050151 A | 2/2000 |
| JP | 2011-055038 A | 3/2011 |

* cited by examiner

*Primary Examiner* — Amy Hsu
(74) *Attorney, Agent, or Firm* — Sony Corporation

(57) ABSTRACT

There is provided an image processing apparatus including an image information combining unit that performs a pixel value combining process on a long-time exposure pixel and a short-time exposure pixel. The pixel information combining unit calculates a plurality of blending ratios based on pixel values of a plurality of pixels of different periods of exposure time, determines an applied blending ratio, which is applied to a blending process for the long-time exposure pixel and the short-time exposure pixel, based on the plurality of blending ratios, and determines pixel values of an output image or an intermediate image which is applied to produce the output image, by the blending process for the long-time exposure pixel and the short-time exposure pixel to which the applied blending ratio is applied.

25 Claims, 16 Drawing Sheets

FIG. 2

(1) BAYER ARRAY (2) FOUR-DIVISIONAL BAYER TYPE RGB ARRAY (3) WRGB ARRAY

FIG. 5

(1) CHANGE EXPOSURE TIME FOR EACH ROW IN BAYER ARRAY

| G | R | G | R |
|---|---|---|---|
| B | G | B | G |
| G | R | G | R |
| B | G | B | G |

(2) CHANGE EXPOSURE TIME FOR EACH COLUMN IN BAYER ARRAY

| G | R | G | R |
|---|---|---|---|
| B | G | B | G |
| G | R | G | R |
| B | G | B | G |

(3) CHANGE EXPOSURE TIME DIAGONALLY IN BAYER ARRAY

| G | R | G | R |
|---|---|---|---|
| B | G | B | G |
| G | R | G | R |
| B | G | B | G |

(4) CHANGE EXPOSURE TIME DIAGONALLY IN FOUR-DIVISIONAL BAYER RGB ARRAY

| G | G | R | R |
|---|---|---|---|
| G | G | R | R |
| B | B | G | G |
| B | B | G | G |

FIG. 6

(1) CHANGE EXPOSURE TIME FOR EACH ROW IN BAYER ARRAY (1a) PICKUP DATA

| GS00 | RS01 | GS02 | RS03 |
|------|------|------|------|
| BS10 | GS11 | BS12 | GS13 |
| GL20 | RL21 | GL22 | RL23 |
| BL30 | GL31 | BL32 | GL33 |

STEP1 →

(1b) INTERMEDIATE DATA

| GW00 | RW01 | GW02 | RW03 |
|------|------|------|------|
| BW10 | GW11 | BW12 | GW13 |

STEP2 →

(1c) OUTPUT DATA

| G00 | R01 |
|-----|-----|
| B10 | G11 |

FIG. 13

(2) CHANGE EXPOSURE TIME FOR EACH COLUMN IN BAYER ARRAY (2a) PICKUP DATA

| GS00 | RS01 | GL02 | RL03 |
|------|------|------|------|
| BS10 | GS11 | BL12 | GL13 |
| GS20 | RS21 | GL22 | RL23 |
| BS30 | GS31 | BL32 | GL33 |

→ STEP1 →

(2b) INTERMEDIATE DATA

| GW00 | RW01 | GW11 | RW21 | GW31 |
|------|------|------|------|------|
| BW10 | GW20 | BW30 | | |

→ STEP2 →

(2c) OUTPUT DATA

| G00 | R01 |
|-----|-----|
| B10 | G11 |

FIG. 14

(3) CHANGE EXPOSURE TIME DIAGONALLY IN BAYER ARRAY (3a) PICKUP DATA

| GS00 | RL01 | GL02 | RS03 |
|------|------|------|------|
| BL10 | GS11 | BS12 | GL13 |
| GL20 | RS21 | GS22 | RL23 |
| BS30 | GL31 | BL32 | GS33 |

STEP1 →

(3b) INTERMEDIATE DATA

| GW00 | RW01 | GW02 | RW03 |
|------|------|------|------|
| BW10 | GW11 | BW12 | GW13 |

STEP2 →

(3c) OUTPUT DATA

| G00 | R01 |
|-----|-----|
| B10 | G11 |

(4) CHANGE EXPOSURE TIME DIAGONALLY IN FOUR-DIVISIONAL BAYER TYPE RGB ARRAY (4a) PICKUP DATA (4b) INTERMEDIATE DATA (4c) OUTPUT DATA

IMAGE PROCESSING APPARATUS, IMAGE PROCESSING METHOD, AND PROGRAM

BACKGROUND

The present disclosure relates to an image processing apparatus, an image processing method, and a program. In particular, the present disclosure relates to an image processing apparatus, an image processing method, and a program that generate images with a high dynamic range (wide dynamic range).

A solid-state image pickup device such as a CCD image sensor or a CMOS (Complementary Metal Oxide Semiconductor) image sensor used in a video camera or a digital still camera carries out photoelectric conversion by accumulating charge in keeping with the amount of incident light and outputting an electrical signal corresponding to the accumulated charge. However, there is a limit on the amount of charge that can be accumulated in a photoelectric conversion element, so that when a certain amount of light has been received, a saturation level is reached, resulting in regions of a subject with a certain brightness or higher being set at a saturation luminance level, a problem referred to as "blown out highlights" or "clipping".

To prevent clipping, processing is carried out to control the charge accumulation period of the photoelectric conversion element in accordance with the change in light from outside or the like to adjust the exposure length and thereby optimize sensitivity. For example, by using a high shutter speed to shorten the exposure length for a bright subject, the charge accumulation period of the photoelectric conversion element is reduced and an electrical signal is outputted before the amount of accumulated charge reaches the saturation level. By carrying out such processing, it is possible to output an image in which tones are correctly reproduced for the subject.

However, if a high shutter speed is used when photographing a subject in which both bright and dark regions are present, the exposure length will not be sufficient for the dark regions, which will result in deterioration in the S/N ratio and a fall in image quality. To correctly reproduce the luminance levels of bright regions and dark regions in a photographed image of a subject that includes both bright and dark regions, it is necessary to use a long exposure for pixels on the image sensor where there is little incident light to achieve a high S/N ratio and to carry out processing to avoid saturation for pixels with large amounts of incident light.

One known method of realizing such processing is to consecutively pick up a plurality of images with different periods of exposure time and then combine such images. That is, a long-time exposure image and a short-time exposure image are separately and consecutively picked up and a combining process that uses the long-time exposure image for dark image regions and the short-time exposure image for bright image regions where clipping would occur for the long-time exposure image is carried out to produce a single image. In this way, by combining the plurality of images with different exposures, it is possible to produce images with a high dynamic range with no clipping, that is, images with a wide dynamic range (HDR images).

For example, Japanese Patent Laid-Open Publication No. 2000-50151 discloses a configuration for producing a wide dynamic range image by consecutively picking up two images with different periods of exposure time and then combining such images. With reference to FIG. 1, such processing is described. An image pickup device outputs two images with different periods of exposure time within a video rate (30-60 fps), for example, in shooting videos. In addition, two images with different periods of exposure time are produced and output also in photographing still images. FIG. 1 depicts features of images (long-time exposure image and short-time exposure image) with different periods of exposure time produced by the image pickup device. A horizontal axis is a time (t) and a vertical axis is an accumulated charge amount (e) in a light receiving photo diode (PD) that composes a photoelectric conversion element corresponding to one pixel of a solid-state image pickup element.

For example, when the light receiving photo diode (PD) receives much light, that is, in the case of a bright subject, the accumulated charge amount sharply increases along with time elapsed, as shown in a high luminance region 11 shown in FIG. 1. Meanwhile, when the light receiving photo diode (PD) receives less light, that is, in the case of a dark subject, the accumulated charge amount gently increases along with time elapsed, as shown in a low luminance region 12 shown in FIG. 1.

Times t0 to t3 correspond to exposure times TL to produce long-time exposure images. The line shown by the low luminance region 12 as such long-time exposure times TL can obtain accurate tones by the tone level of a pixel determined using electrical signals obtained based on such an accumulated charge amount (Sa) without reaching a saturation level (non-saturation point Py).

However, the line shown by a high luminance region 11 represents that before the time t3, the accumulated charge had already reached a saturation level (saturation point Px). Accordingly, such a high luminance region 11 obtains only a pixel value corresponding to an electrical signal of the saturation level from the long-time exposure images and becomes a clipping pixel as a result.

In such a high luminance region 11, the accumulated charges of the light receiving photo diode (PD) are swept once before reaching the time t3, for example, in the time t1 (charge sweeping start point P1) shown in FIG. 1. The charge sweeping is carried out to an intermediate voltage maintaining level controlled in the photo diode (PD), rather than with all of the charges accumulated in the light receiving photo diode (PD). After the charge sweeping, a short-time exposure is carried out for exposure times (t1 to t2), again. That is, the short-time exposure from a short-time exposure start point P2 to a short-time exposure end point P3, as shown in the figure, is carried out. An accumulated charge amount (Sb) is obtained through such a short-time exposure, and the tone level of a pixel is determined based on electrical signals obtained based on the accumulated charge amount (Sb).

Further, when a pixel value based on the electrical signals which are based on the accumulated charge amount (Sa) obtained through the long-time exposure in the low luminance region 12 and the electrical signals which are based on the accumulated charge amount (Sb) obtained through the short-time exposure in the high luminance region 11 is determined, an estimated accumulated charge amount when the exposures have been carried out for the same time or an electrical signal output value corresponding to the estimated accumulated charge amount is calculated, and a pixel level is determined based on the calculated result.

In this way, it is possible to produce images with a high dynamic range without clipping by combining the short-time exposure images and the long-time exposure images.

However, in the configuration described in Japanese Patent Laid-Open Publication No. 2000-50151, it is necessary to perform the process in which the long-time exposure images and the short-time exposure images are individually photographed and combined.

In this way, it is possible to produce the wide dynamic range images (HDR images) using the plurality of images with different periods of exposure time, but, for example, the following problems occur in processing based on the plurality of images.

Problem 1: It is necessary to photograph images several times, and in addition, it is necessary to provide with a memory to store these images.

Problem 2: Since a plurality of images with different photographing timings is combined or photographed data obtained through the long-time exposure is used, it is vulnerable to shaking of a camera.

In addition, image pickup elements used in many cameras have configurations in which color filters with, for example, an RGB array are mounted and light of a specific wavelength enters each pixel.

In particular, a color filter with, for example, a Bayer array is frequently used.

A picked-up image with a Bayer array becomes a mosaic image where only pixel values corresponding to any of RGB colors are set to each pixel of the picked-up image. The signal processing unit of a camera performs various signal processing such as pixel value interpolation for this mosaic image, performs de-mosaic processing of setting all pixel values of RGB to each pixel, and produces and outputs camera images.

It can be said that many studies have already been made for signal processing on a picked-up image with a color filter according to such a Bayer array, which has thus been technically established to some extent. However, it is also true that studies on signal processing on an image with an array different from the Bayer array are yet insufficient.

Further, for example, in addition to each color of RGB as a filter pertaining to a pickup image element, Japanese Patent Laid-Open Publication No. 2011-55038 discloses correction processing for a picked-up image of an image pickup apparatus with a filter with an RGBW array that has an entire wavelength transparent W (White) pixel.

SUMMARY

The present disclosure is made, for example, in light of such a situation and the objective of the present disclosure is to provide an image processing apparatus, an image processing method and a program that can produce a wide dynamic range image based on an image obtained by single photographing.

Further, the objective of the present disclosure is to provide an image processing apparatus, an image processing method and a program that can produce a wide dynamic range image based on a photographed image with an array different from, for example, a Bayer array.

According to a first embodiment of the present disclosure, there is provided an image processing apparatus, including an image information combining unit that performs a pixel value combining process on a long-time exposure pixel and a short-time exposure pixel. The pixel information combining unit calculates a plurality of blending ratios based on pixel values of a plurality of pixels of different periods of exposure time, determines an applied blending ratio, which is applied to a blending process for the long-time exposure pixel and the short-time exposure pixel, based on the plurality of blending ratios, and determines pixel values of an output image or an intermediate image which is applied to produce the output image, by the blending process for the long-time exposure pixel and the short-time exposure pixel to which the applied blending ratio is applied.

Further, according to an embodiment of the image processing apparatus of the present disclosure, there is provided the pixel information combining unit calculates the plurality of blending ratios based on the pixel values of the plurality of pixels of different periods of exposure time to be blended, and determines the applied blending ratio based on the calculated plurality of blending ratios.

Further, according to an embodiment of the image processing apparatus of the present disclosure, there is provided the pixel information combining unit calculates the plurality of blending ratios based on pixel values of pixels adjacent to the plurality of pixels of different periods of exposure time to be blended, and determines the applied blending ratio based on the calculated plurality of blending ratios.

Further, according to an embodiment of the image processing apparatus of the present disclosure, there is provided the pixel information combining unit calculates a long-time exposure pixel value dependent blending ratio $\alpha L$ that is dependent on the pixel value of the long-time exposure pixel, and a short-time exposure pixel value dependent blending ratio $\alpha S$ that is dependent on the pixel value of the short-time exposure pixel, and determines the product of the calculated long-time exposure pixel value dependent blending ratio $\alpha L$ and the calculated short-time exposure pixel value dependent blending ratio $\alpha S$, that is, $\alpha = \alpha L \times \alpha S$, the $\alpha$ is determined as the applied blending ratio representing a blending amount of the short-time exposure pixel.

Further, according to an embodiment of the image processing apparatus of the present disclosure, there is provided the pixel information combining unit determines the long-time exposure pixel dependent blending ratio $\alpha L$ such that depending on a pixel value CL of a long-time exposure pixel of a color C as a pixel to be blended, $\alpha L=0$ when $CL<TH0L$, $\alpha L=(CL-TH0L)/(TH1L-TH0L)$ when $TH0L \leq CL \leq TH1L$, and $\alpha L=1.0$ when $TH1L<CL$, and the short-time exposure pixel dependent blending ratio $\alpha S$ such that depending on a pixel value CS of the short-time exposure pixel of the color C as the pixel to be blended, $\alpha S=0$ when $CS<TH0S$, $\alpha L=(CL-TH0S)/(TH1S-TH0S)$ when $TH0S \leq CS \leq TH1S$, and $\alpha L=1.0$ when $TH1S<CL$. TH0L, TH1L, TH0S, and TH1S are predefined threshold values.

Further, according to an embodiment of the image processing apparatus of the present disclosure, there is provided the pixel information combining unit calculates a pixel value CW of a color C of the output image or the intermediate image through the following expression $CW=\alpha \times CS \times GAIN + (1.0-\alpha) \times CL$ where CL is a pixel value of a long-time exposure pixel of the color C, CS is a pixel value of a short-time exposure pixel of the color C, GAIN is an exposure ratio of a long-time exposure pixel and a short-time exposure pixel, and $\alpha$ is the applied blending ratio.

Further, according to an embodiment of the image processing apparatus of the present disclosure, there is provided the pixel information combining unit produces the intermediate image by the blending process for the long-time exposure pixel and the short-time exposure pixel to which the applied blending ratio is applied, and produces a final output image by the blending process for pixel values of the same color composing the produced intermediate image.

Further, according to an embodiment of the image processing apparatus of the present disclosure, there is provided the pixel information combining unit receives image data with an RGB array in which the long-time exposure pixel and the short-time exposure pixel are mixed, and determines the pixel values of the output image or the intermediate image by blending the long-time exposure pixel and the short-time exposure pixel whose colors are the same, for each color of RGB.

Further, according to an embodiment of the image processing apparatus of the present disclosure, there is provided the pixel information combining unit determines the applied blending ratio by applying only G pixel data of the image data with the RGB array.

According to a second embodiment of the present disclosure, there is provided an image processing method performed in an image processing apparatus, the image processing method, including performing a pixel value combining process on a long-time exposure pixel and a short-time exposure pixel by a pixel information combining unit. The pixel value combining process includes processes of calculating a plurality of blending ratios based on pixel values of a plurality of pixels of different periods of exposure time, determining an applied blending ratio, which is applied to a blending process for the long-time exposure pixel and the short-time exposure pixel, based on the plurality of blending ratios, and determining pixel values of an output image or an intermediate image which is applied to the output image through the blending process for the long-time exposure pixel and the short-time exposure pixel to which the applied blending ratio is applied.

According to a third embodiment of the present disclosure, there is provided a program for causing image processing to be performed in an image processing apparatus. The program causes a pixel information combining unit to perform a pixel value combining process on a long-time exposure pixel and a short-time exposure pixel. The pixel value combining process includes processes of calculating a plurality of blending ratios based on pixel values of a plurality of pixels of different periods of exposure time, determining an applied blending ratio, which is applied to a blending process for the long-time exposure pixel and the short-time exposure pixel, based on the plurality of blending ratios, and determining pixel values of an output image or an intermediate image which is applied to the output image by the blending process for the long-time exposure pixel and the short-time exposure pixel to which the applied blending ratio is applied.

Note that the program according to the present disclosure is a program that can be provided in a storage medium or communication medium that is provided in a computer-readable form for an information processing device or a computer system that is capable of executing various types of program code, for example. Providing this sort of program in a computer-readable form makes it possible to implement the processing according to the program in the information processing device or the computer system.

The purposes, features, and advantages of the present disclosure will be made clear later by a more detailed explanation that is based on the embodiments of the present disclosure and the appended drawings. Furthermore, the system in this specification is not limited to being a configuration that logically aggregates a plurality of devices, all of which are contained within the same housing.

According to the embodiments of the present disclosure, an apparatus and a method that perform the pixel value combination of a long-time exposure pixel and a short-time exposure pixel to produce a wide dynamic range image are realized.

In particular, the present disclosure includes a pixel information combining unit for producing the pixel value of an output image by performing the combination of the pixel values of a long-time exposure pixel and a short-time exposure pixel. The pixel information combining unit calculates a plurality of blending ratios calculated based on the pixel values of a plurality of different pixels, determines a final blending ratio of a final long-time exposure pixel and a final short-time exposure pixel based on the plurality of blending ratios, and determines the pixel value of the output image by blending of the long-time exposure pixel and the short-time exposure pixel to which the final blending ratio has been applied. It is possible to produce a wide dynamic range image through such processing.

BRIEF DESCRIPTION OF THE DRAWINGS

FIG. 2 is a diagram for describing an example of a configuration of an image pickup element;

FIG. 5 is a diagram for describing an exposure control configuration;

FIG. 6 is a diagram for describing a pixel information combination example;

FIG. 13 is a diagram for describing a pixel information combination example;

FIG. 14 is a diagram for describing a pixel information combination example;

DETAILED DESCRIPTION OF THE EMBODIMENTS

Figure 1:
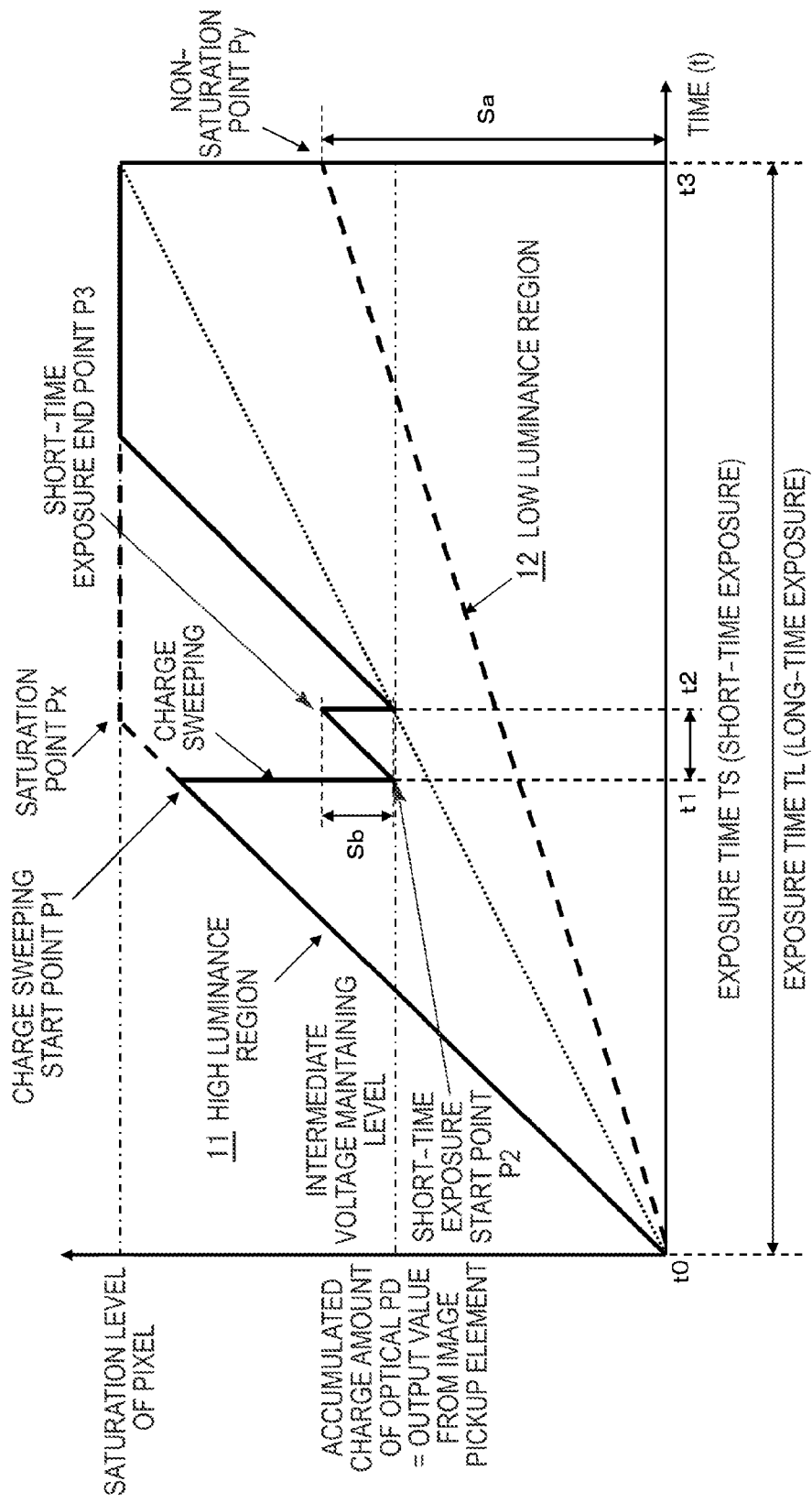
FIG. 1 is a diagram for describing a photographing example of a wide dynamic range image by several-time image photographing.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

With reference to the drawings, an image processing apparatus, an image processing method, and a program of the present disclosure will be described in detail. Further, the description is made according to items below.

1. Example of configuration of image pickup element
2. Example of configuration of image processing apparatus
3. Example of configuration of image pickup device
4. Configuration of pixel unit and setting example of exposure time
5. Embodiments of producing image
5-1. Embodiment 1. Example in which exposure time is changed for each row in Bayer array 5-2. Effect of pixel blending when blending ratio α=αL×αS is applied 5-3. Embodiment 2. Example in which exposure time is changed for each column in Bayer array 5-4. Embodiment 3. Example in which exposure time is changed diagonally in Bayer array 5-5. Embodiment 4. Example in which exposure time is changed diagonally in four-divisional Bayer array 6. Other examples of configuration of image processing apparatus 7. Conclusion of constitution of present disclosure

1. Example of Configuration of Image Pickup Element

With reference to FIG. 2, an example of a configuration of an image pickup element will be described. In FIG. 2, the following three configuration examples of the image pickup element are shown.

(1) Bayer array
(2) Four-divisional Bayer type RGB array
(3) RGBW array

Further, for G of the RGB array, there are cases in which G of the R column is shown as Gr, and G of the B column as Gb.

(1) The Bayer array is employed in many cameras, and signal processing on a picked-up image with a color filter with such a Bayer array has been established.

However, for (2) a four-divisional Bayer type RGB array and (3) an RGBW array, it cannot be said that sufficient studies have been made on signal processing on images photographed through an image pickup element with such filters.

Further, (2) a four-divisional Bayer type RGB array corresponds to an array in which each pixel of R, G and B of the Bayer array shown in (1) is set as four pixels.

An image processing apparatus that performs signal processing for images photographed through an image pickup element with a color filter with such (2) a four-divisional Bayer type RGB array will be described.

2. Example of Configuration of Image Processing Apparatus

Figure 3:
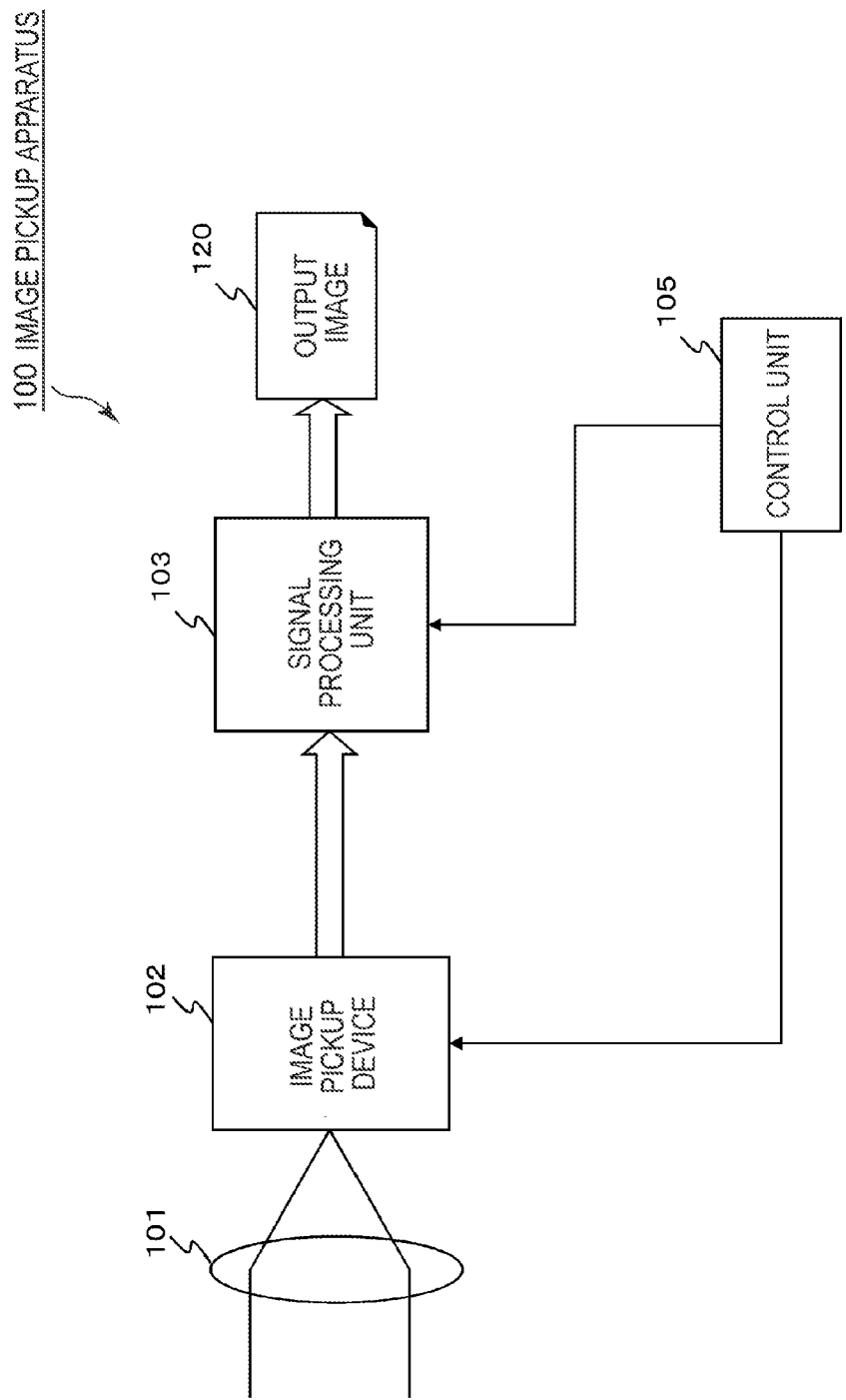
FIG. 3 is a diagram for describing an example of a configuration of an image pickup apparatus.

In FIG. 3, an example of a configuration of an image pickup apparatus 100 that is one example of an image processing apparatus of the present disclosure is shown.

FIG. 3 is a block diagram illustrating an example of a configuration of the image pickup apparatus. Light incident through an optical lens 101 enters an image pickup device 102 consisting of an image pickup unit, for example, a CMOS image sensor or the like, and outputs image data by photoelectric conversion. Output image data is input to a signal processing unit 103. The signal processing unit 103 performs general signal processing in cameras, such as white balance (WB) adjustment, gamma correction or the like, to produce output images 120. The output images are stored in a storage unit, which is not shown. The output images can be output to a display unit.

A control unit 105 outputs control signals to each unit according to programs stored in, for example, a non-illustrated memory to control various kinds of processing.

3. Example of Configuration of Image Pickup Device

Next, with reference to FIG. 4, an example of a configuration of an image pickup device 102 will be described.

Figure 4:
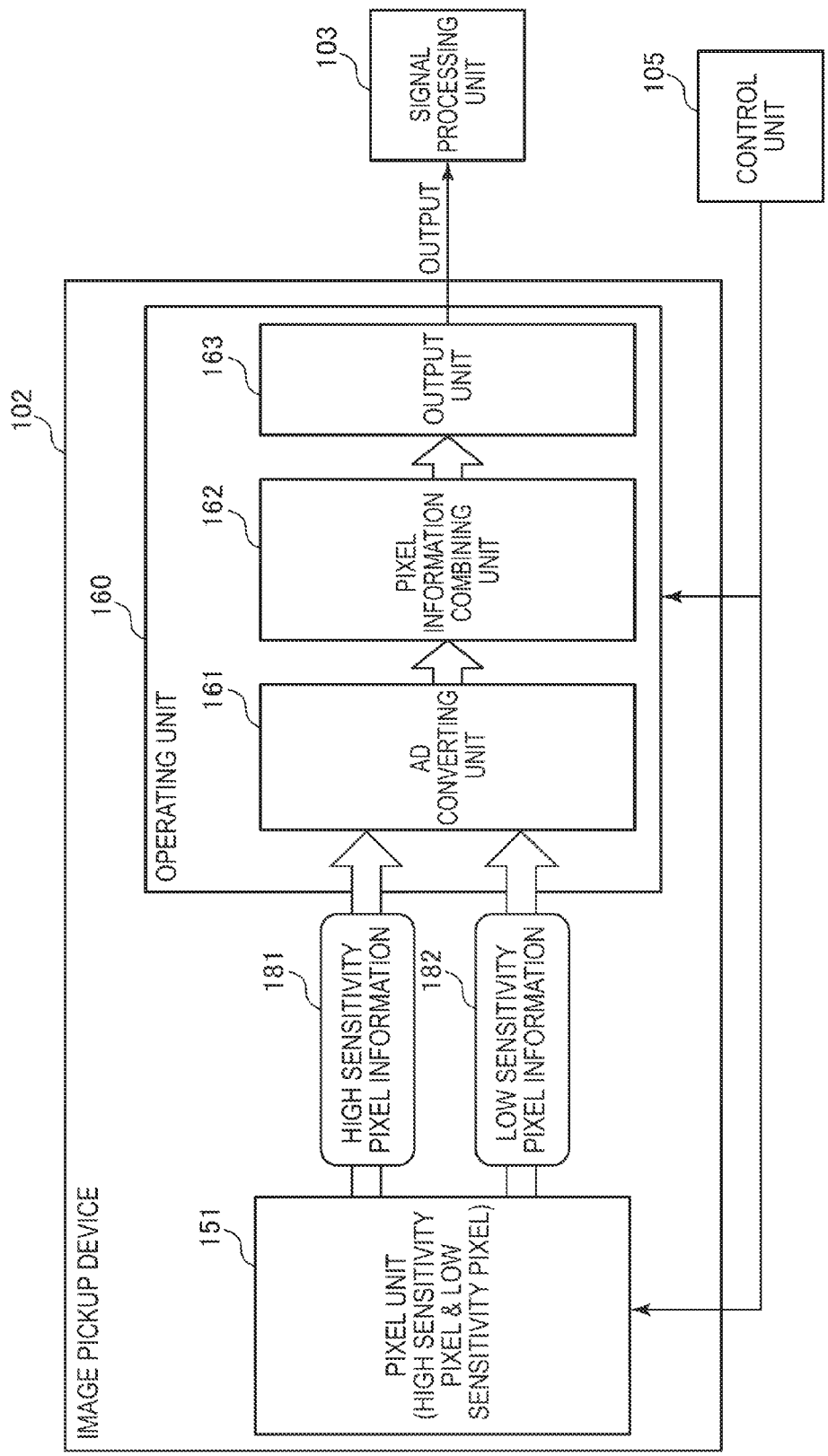
FIG. 4 is a diagram for describing an example of a configuration of an image pickup device.

FIG. 4 is a diagram that shows the configuration of the image pickup device 102 of an embodiment of the present disclosure.

The image pickup device 102 includes a pixel unit 151 and an operating unit 160, as shown in FIG. 4. The operating unit 160 includes an AD converting unit 161, a pixel information combining unit 162 and an output unit 163.

Further, the operating unit 160 may be on the same chip as, that is, on-chip with, the pixel unit 151, and may be set in a chip or an apparatus other than the pixel unit 151.

The pixel unit 151 accumulates charges in each of a multiple number of pixels based on subject light, and outputs image data of a large number of pixels, which are high resolution images.

Further, the pixel unit 151 includes a high sensitivity pixel, which conducts long-time exposure, and a low sensitivity pixel, which conducts short-time exposure.

High sensitivity pixel information 181 and low sensitivity pixel information 182 are input to the operating unit 160 of the image pickup device 102 from the pixel unit 151.

The A/D converting unit 161 of the operating unit 160 performs the A/D conversion of such input signals, that is, conversion of analog signals to digital signals, and the converted digital values are input to the pixel information combining unit 162.

The pixel information combining unit 162 calculates output pixel values by blending the high sensitivity pixel information 181 and the low sensitivity pixel information 182. For example, one pixel value of the output image is calculated based on four pixel signals. Such pixel value combination is performed and a wide dynamic image with fewer pixels is produced and output through the output unit 163.

4. Configuration of Pixel Unit and Setting Example of Exposure Time

With reference to FIG. 5, the configuration of the pixel unit 151 and a setting example of an exposure time will be described. In FIG. 5, the following four examples are represented.

(1) Change of exposure time for each row in Bayer array
(2) Change of exposure time for each column in Bayer array
(3) Change of exposure time diagonally in Bayer array
(4) Change of exposure time diagonally in four-divisional Bayer type RGB array Among pixels represented in each array in FIG. 5, the gray parts are short-time exposure pixels whose exposure time is short, that is, low sensitivity pixels.

The white parts are long-time exposure pixels whose exposure time is long, that is, high sensitivity pixels.

Next, the production of a wide dynamic image based on a photographed image in each setting will be described.

5. Embodiment of Producing Image

Next, a particular processing example in the pixel information combining unit 162 will be described with reference to drawings including FIG. 6.

Further, although the processing in the following description is described as being performed by the pixel information combining unit 162 of the operating unit 160 of an image pickup device 102, it may be a scheme, for example, in which the pixel information combining unit 162 is set to the signal processing unit 103 represented in FIG. 3 without setting the pixel information combining unit 162 to the image pickup device 102 and the processing to be described below is performed in the signal processing unit 103.

5-1. Embodiment 1

Example in which Exposure Time is Changed for Each Row in Bayer Array

FIG. 6 shows an example in which an exposure time is changed for each row in a Bayer array.

FIG. 6 shows the following three data items:

(1a) image pickup data (1b) intermediate data (1c) output data.

(1a) image pickup data is for an image pickup element, and shows an image photographed when the exposure time is changed for each row in a Bayer array.

White parts are long-time exposure pixels, and gray parts show short-time exposure pixels.

For example, GS00 is the short-time (S) exposure pixel of the G pixel of the coordinate location (0, 0). GL20 is the long-time (L) exposure pixel of G pixel of the coordinate location (2, 0).

Further, coordinates are represented in the format of, for example, GSxy, GLxy by applying a coordinate (x, y) in which a vertical down direction is shown as x and a horizontal right direction is shown as y.

In this example, long-time exposure pixels and short-time exposure pixels are alternately set on a two-row basis.

Further, such exposure time control is carried out based on the control of, for example, a control unit 105.

The image pickup data represented in FIG. 6 (1a) represents a 4×4 pixel area that is a partial pixel area composing the pixel unit of an image pickup device 102 in FIG. 4.

The intermediate data represented in FIG. 6 (1b) represents intermediate data that is produced by the pixel information combining unit 162 based on the 4×4 (1a) image pickup data.

The pixel information combining unit 162 first calculates the 4×2 intermediate data represented in FIG. (1b) based on the 4×4 (1a) image pickup data in step 1.

The output data represented in FIG. 6 (1c) represents output data, which is produced by the pixel information combining unit 162 based on the 4×2 (1b) intermediate data.

The pixel information combining unit 162 first calculates the 4×2 (1b) intermediate data based on the 4×4 (1a) image pickup data in step 1, and produces 2×2 (1c) output data based on the produced intermediate data in step 2.

(1c) output data is produced as a wide dynamic image.

In this way, the pixel information combining unit 162 calculates the 4×2 (1b) intermediate data through blending the pixel values of a long-time exposure pixel and a short-time exposure pixel that are included in the 4×4 (1a) image pickup data, and produces and outputs the 2×2 (1c) output data by blending the component pixels of the intermediate data.

Each of step 1 and step 2 will be described.

(Step 1)

The producing of (1b) intermediate data from (1a) image pickup data in step 1 is carried out by blending a plurality of pixel values below.

The blending is carried out individually for G pixels and for R and B pixels.

Further, for G pixels of an RGB array, G pixels of an R column below are described as GR, and G pixels of a B column are described as GB.

The combining (blending) of pixels carried out to produce (1b) intermediate data from (1a) image pickup data of present embodiment is performed individually for G pixels, that is, pixels of a GR/GB phase, and for R and B pixels, that is, pixels of an R/B phase.

Next, such processing will be described.

(Processing on GR/GB Phase)

For example, the pixel value (GW00) of GW00 represented in the left upper of the FIG. 6 (1b) intermediate data is calculated through the following expression having applied the pixel values of a plurality of pixels included in (1a) image pickup data and a blending ratio α.

$$GW00 = \alpha \times GS00 \times GAIN + (1.0 - \alpha) \times GL20$$

Here,

GS00: A pixel value of a G pixel that is a short-time exposure pixel at the pixel location (0, 0), GL20: A pixel value of a G pixel that is a long-time exposure pixel at the pixel location (2, 0), GAIN: a gain by which a pixel value of a short-time exposure pixel is multiplied (an exposure ratio of a long-time exposure pixel and a short-time exposure pixel)

α: a blending ratio of the pixel value of the long-time exposure pixel and the pixel value of the short-time exposure pixel.

Here, the blending ratio α is the product of two blending ratios, that is, αL and αS that are, a long-time exposure pixel value dependent blending ratio: αL, a short-time exposure pixel value dependent blending ratio: αS, $$\alpha = \alpha L \times \alpha S$$

In calculating GW00 of intermediate data represented in FIG. 6 (1b), a long-time exposure pixel value dependent blending ratio: αL, a short-time exposure pixel value dependent blending ratio: αS, $$\alpha = \alpha L \times \alpha S,$$

each of these values is calculated through the following expression.

$$\alpha L = CalcBrate(GL20, THR0\_LNG, THR1\_LNG)$$

$$\alpha S = CalcBrate(GS00, THR0\_SHT, THR1\_SHT)$$

$$\alpha = \alpha L \times \alpha S$$

Here, the value of CalcBrate(dat, THR0, THR1)

CalcBrate(dat, THR0, THR1)=0 where dat<THR0,

CalcBrate(dat, THR0, THR1)=(dat−THR0)/(THR1−THR0) where THR0≤dat<THR1,

CalcBrate(dat, THR0, THR1)=1.0 where THR1≤dat.

Figure 7:
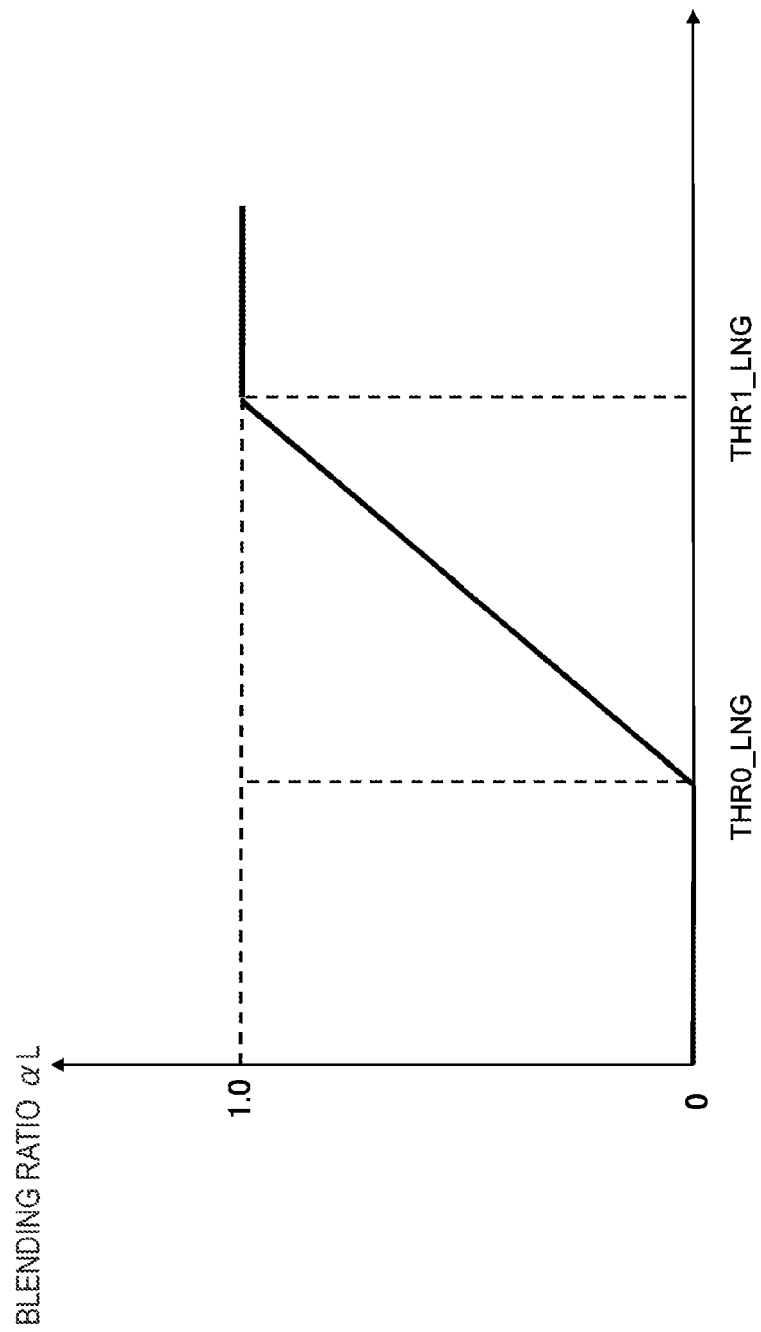
FIG. 7 is a diagram for describing a setting example of a blending ratio.
Figure 8:
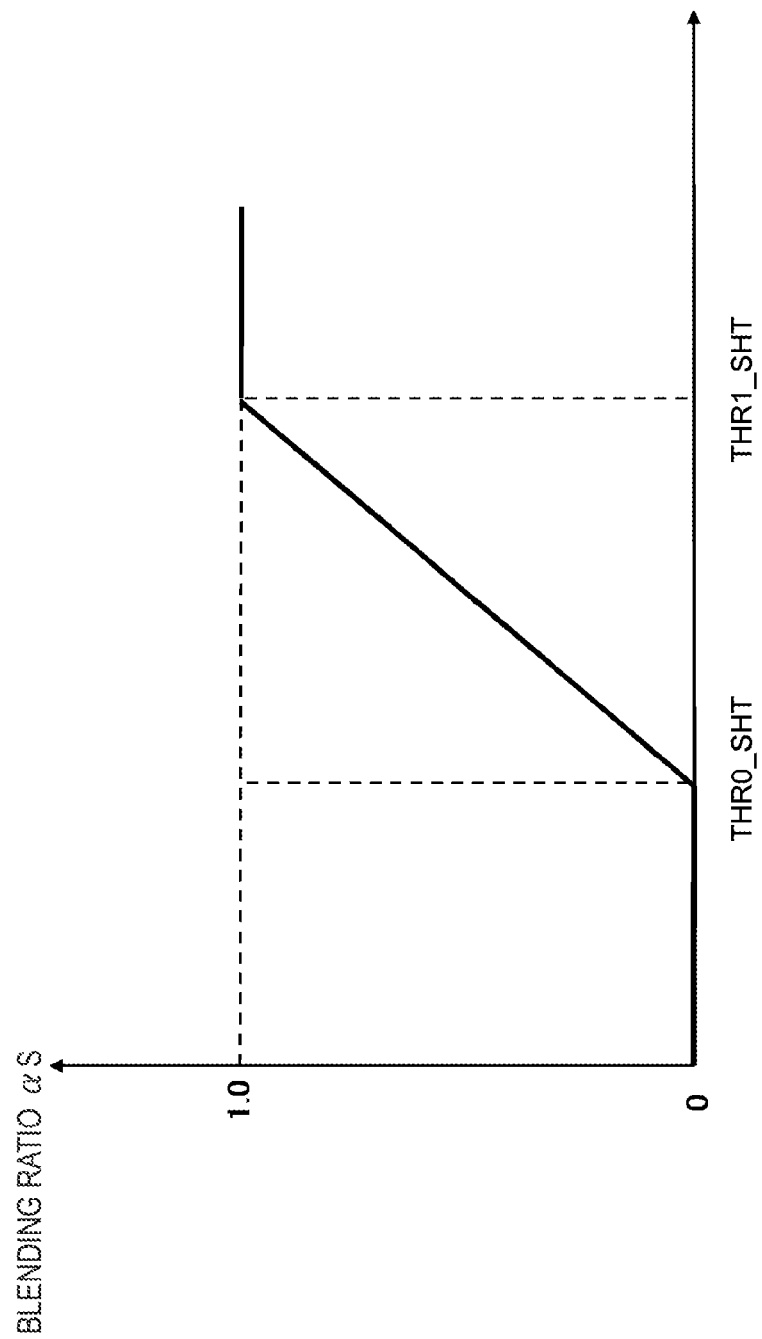
FIG. 8 is a diagram for describing a setting example of a blending ratio.

The particular example of a relation of two blending ratios αL and αS and threshold values THR0 and THR1 is represented in FIGS. 7 and 8.

Further,

THR0_LNG, THR1_LNG: Threshold values that have been applied to calculate the blending ratio αL applying a long-time exposure pixel, THR0_SHT, THR1_SHT: Threshold values that have been applied to calculate the blending ratio αS applying a long-time exposure pixel.

Further, the blending ratio αS applying a short-time exposure pixel corresponds to, for example, a value obtained by subtracting the blending ratio αL applying a long-time exposure pixel from GAIN described above.

In this way, in producing intermediate data represented in FIG. 6 (1b) having a half number of pixels from image pickup data including long-time exposure pixels and short-time exposure pixels represented in FIG. 6 (1a), the pixel value (GWxy) of the intermediate data determines a short-time exposure pixel GSxy and a long-time exposure pixel GLxy in the same column as a target pixel to obtain such a pixel value through blending in which the blending ratio α described above is applied.

Here, the blending ratio α is calculated as follows:

a long-time exposure pixel value dependent blending ratio: αL, a short-time exposure pixel value dependent blending ratio: αS, and the two different pixel dependent blending ratios are multiplied, that is, $$\alpha=\alpha L \times \alpha S.$$

Further, the long-time exposure pixel value dependent blending ratio: αL, and the short-time exposure pixel value dependent blending ratio: αS, that are applied to calculate the blending ratio ($\alpha=\alpha L \times \alpha S$) are calculated based on the pixel values of a long-time exposure pixel and a short-time exposure pixel, respectively, being applied in the α-blending of a G pixel, which is a calculation target.

In other words, the long-time exposure pixel value dependent blending ratio αL, $$\alpha L=\text{CalcBrate}(GL20, THR0\_LNG, THR1\_LNG)$$

is calculated according to the pixel value of a long-time exposure pixel applied in the α-blending of the G pixel, which is the calculation target, as in the expression above.

Likewise, the short-time exposure pixel value dependent blending ratio αS, $$\alpha S=\text{CalcBrate}(GS00, THR0\_SHT, THR1\_SHT)$$

is calculated according to the pixel value of a short-time exposure pixel applied in the α-blending of the G pixel, which is the calculation target, as in the expression above.

(Processing in R/B Phase)

Next, determination of the pixel values of an R pixel and a B pixel set to FIG. 6 (1b) intermediate data will be described.

For example, the pixel value (RW01) of RW01 represented in FIG. 6 (1b) is calculated through the following expression in which the pixel values of a plurality of pixels included in (1a) image pickup data and the blending ratio α are applied.

$$RW01=\alpha \times RS01 \times \text{GAIN}+(1.0-\alpha) \times RL21$$

Here,

RS01: An R pixel that is the short-time exposure pixel of a pixel location (0, 1)

RL21: An R pixel that is the long-time exposure pixel of a pixel location (2, 1)

GAIN: a gain by which a pixel value of a short-time exposure pixel is multiplied (an exposure ratio of the long-time exposure pixel and the short-time exposure pixel)

α: a blending ratio of the pixel value of the long-time exposure pixel and the pixel value of the short-time exposure pixel Here, the blending ratio α is calculated as the product of the following two blending ratios, αL and αS.

$$\alpha L=\text{CalcBrate}((GL20+GL22)/2.0, THR0\_LNG, THR1\_LNG)$$

$$\alpha S=\text{CalcBrate}((GS00+GS02)/2.0, THR0\_SHT, THR1\_SHT)$$

$$\alpha=\alpha L \times \alpha S$$

Here, the value of CalcBrate(dat, THR0, THR1) is as shown in FIGS. 7 and 8 described above.

CalcBrate(dat, THR0, THR1)=0 where dat<THR0

CalcBrate(dat, THR0, THR1)=(dat−THR0)/(THR1−THR0) where THR0≤dat<THR1,

CalcBrate(dat, THR0, THR1)=1.0 where THR1≤dat.

In this way, in producing intermediate data represented in FIG. 6 (1b) having half the number of pixels of image pickup data including long-time exposure pixels and short-time exposure pixels represented in FIG. 6 (1b), a short-time exposure pixel RSxy and a long-time exposure pixel RLxy in the same column as a target pixel to obtain such a pixel value are determined through blending in which the blending ratio α described above is applied, when calculating the R pixel value (RWxy) of the intermediate data.

Likewise, when calculating the B pixel value (BWxy) of the intermediate data, a short-time exposure pixel BSxy and a long-time exposure pixel BLxy in the same column as a target pixel to obtain such a pixel value are determined through blending in which the blending ratio α described above is applied.

Here, the blending ratio α is calculated as follows:

a long-time exposure pixel value dependent blending ratio: αL, a short-time exposure pixel value dependent blending ratio: αS, and the two different pixel dependent blending ratios are multiplied, that is, $$\alpha=\alpha L \times \alpha S.$$

Further, each of the long-time exposure pixel value dependent blending ratio: αL, the short-time exposure pixel value dependent blending ratio: αS, that are applied to calculate the blending ratio ($\alpha=\alpha L \times \alpha S$) is calculated with the pixel value of a G pixel.

In other words, the long-time exposure pixel value dependent blending ratio αL, $$\alpha L=\text{CalcBrate}((GL20+GL22)/2.0, THR0\_LNG, THR1\_LNG)$$

is calculated with an average value of two long-time exposure G pixels adjacent to the long-time exposure pixel applied in the α-blending of an R pixel or a B pixel, which is a calculation target, as in the expression above.

Likewise, the short-time exposure pixel value dependent blending ratio αS, $$\alpha S=\text{CalcBrate}((GS00+GS02)/2.0, THR0\_SHT, THR1\_SHT)$$

is calculated with an average value of two long-time exposure G pixels adjacent to the short-time exposure pixel applied in the α-blending of an R pixel or a B pixel, which is a calculation target, as in the expression above.

In this way, the calculation of the blending ratio α is carried out on all the RGB pixels with G pixel data. In this way, by performing uniform processing, the difference between blending ratios is controlled so that natural images can be produced.

(Step 2)

Next, step 2 represented in FIG. 6 will be described. The producing of (1c) output data from (1b) intermediate data in step 2 is carried out through the horizontal addition of a pixel value included in (1b) intermediate data, as will be described.

For example, either of 1:1 addition and 1:3/3:1 addition represented below is applied.

The calculating example of pixel values G00, R01 represented in FIG. 6 (1c) output data will be described.

(1:1 Addition)

In 1:1 addition, the pixel values G00, R01 represented in (1c) output data are calculated through the following expressions.

$$G00=(GW00+GW02)/2$$

$$R01=(RW01+RW03)/2$$

(1:3/3:1 Addition)

In 1:3 or 3:1 addition, the pixel values G00, R01 represented in (1c) output data are calculated through the following expressions.

$$G00=(3 \times GW00+GW02)/4$$

$$R01=(RW01+3 \times RW03)/4$$

In this way, in producing (1c) output data from (1b) intermediate data represented in FIG. 6, the pixel value of the output data is obtained by combining (blending) the pixel value of a pixel in the same column and with the same color with those of the intermediate data.

(1:1 addition) above is the calculation of the average value of two pixels and (1:3 addition) is the addition of a weight depending on a distance.

Through either of such processing, (1c) output data is produced from (1b) intermediate data represented in FIG. 6.

5-2. Effect of Pixel Blending when Blending Ratio α=αL×αS is Applied

In this embodiment as described above, when producing (1b) intermediate data from the image pickup data represented in FIG. 6 (1a), the pixel value of the intermediate data is calculated through blending of a long-time exposure pixel and a short-time exposure pixel that are included in the image pickup data.

In producing such intermediate data, a blending ratio α of the pixel value of a long-time exposure pixel and the pixel value of a short-time exposure pixel is calculated through the product of a blending ratio αL in which the long-time exposure pixel is applied according to a graph shown in FIG. 7 and a blending ratio αS in which the short-time exposure pixel is applied according to a graph shown in FIG. 8. In other words, $$A=\alpha L \times \alpha S.$$

For example, if one pixel value (the pixel value of intermediate data) is calculated by applying the pixel value of the long-time exposure pixel of a pixel location (x1, y1):Lx1y1, and the pixel value of the short-time exposure pixel of a pixel location (x2, y2):Sx2y2.

then αL, αS, and α are calculated through the following expressions.

$$\alpha L = \text{CalcBrate}(Lx1y1, THR0\_LNG, THR1\_LNG)$$

$$\alpha S = \text{CalcBrate}(Sx2y2, THR0\_SHT, THR1\_SHT)$$

$$\alpha = \alpha L \times \alpha S$$

Here, the value of CalcBrate(dat, THR0, THR1) is
CalcBrate(dat, THR0, THR1)=0 where dat<THR0,
CalcBrate(day, THR0, THR1)=(dat−THR0)/(THR1−THR0) where THR0≤dat<THR1,
CalcBrate(dat, THR0, THR1)=1.0 where THR1≤dat.

In this way, the effect of calculating and applying a blending ratio that has been calculated as the product of the blending ratio αL to which the long-time exposure pixel is applied and the blending ratio αS to which the short-time exposure pixel is applied, that is, $$\alpha = \alpha L \times \alpha S$$

will be described.

Typically, for example, either of
the blending ratio αL to which the long-time exposure pixel is applied, and
the blending ratio αS to which the short-time exposure pixel is applied, has been used as a blending ratio α as it is.

However, if a blending ratio is determined based on the pixel value of either of the long-time exposure pixel and short-time exposure pixel in this way, then there is a possibility of a calculated blending ratio being set as an undesirable value when a great change in a pixel value occurs due to the movement of a subject between the photographing period for the long-time exposure pixel and the photographing period for the short-time exposure pixel.

Figure 9:
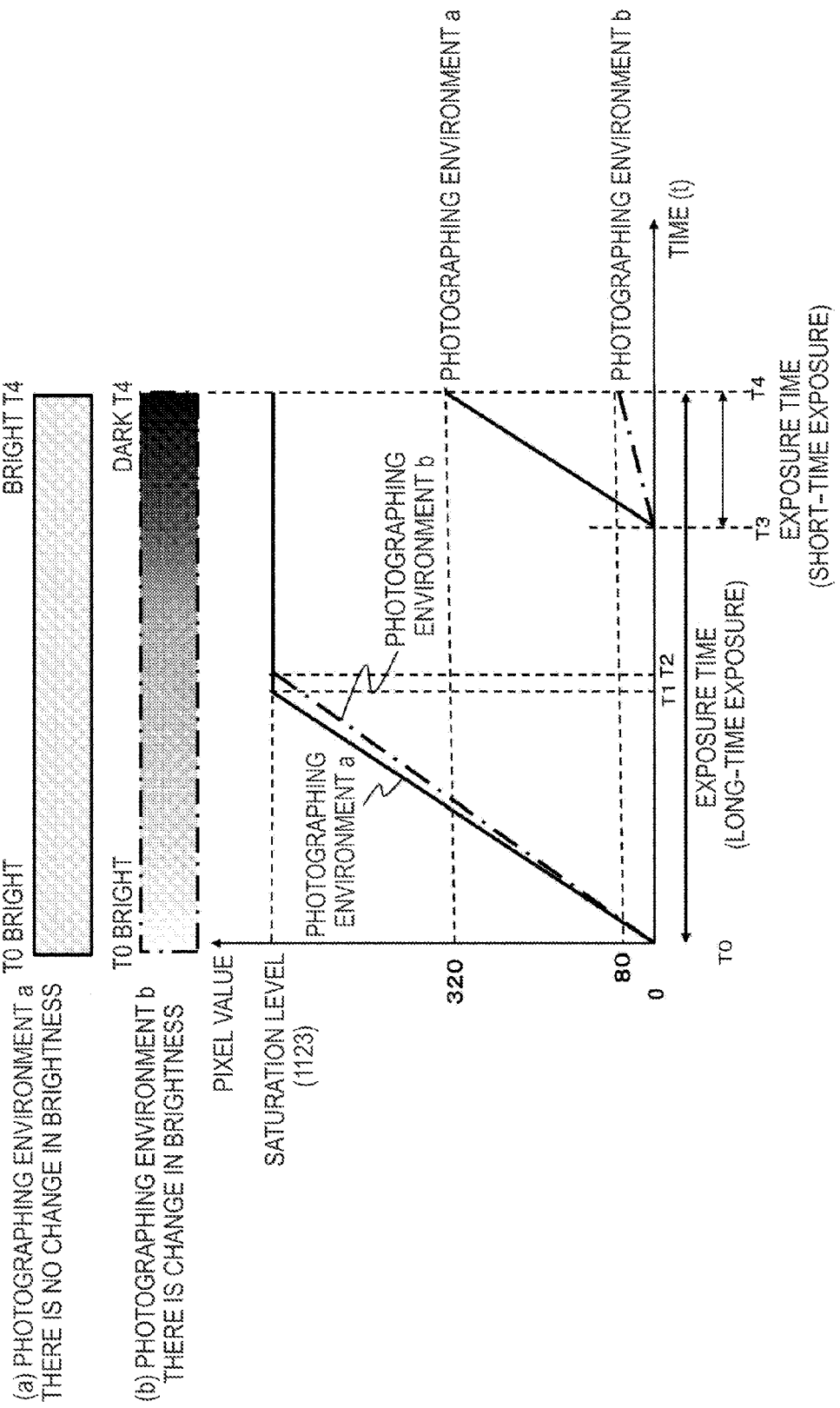
FIG. 9 is a diagram for describing an effect of applying the blending ratio $\alpha=\alpha L \times \alpha S$.

An example of the pixel values of a long-time exposure pixel, a short-time exposure pixel corresponding to the occurrence of a change in luminance in photographing images is shown in FIG. 9.

A graph shown in FIG. 9 represents
times (t) on a horizontal axis,
pixel values on a vertical axis.
For a long-time exposure, times T0 to T4 are exposure time.
For a short-time exposure, times T3 to T4 are exposure time.
As a photographing environment, two patterns are represented as examples.

The transition of the pixel values of a long-time exposure pixel and a short-time exposure pixel in two cases:

(a) a case in which there is no change in brightness over the entire period of a long-time exposure period and a short-time exposure period, and (b) a case in which it is bright in the first half of the long-time exposure period, but gets dark in the short-time exposure period (the second half of the long-time exposure period), is represented.

In both cases (a) and (b), the long-time exposure pixel reaches a saturation level (e.g., a pixel value=1023) during an exposure period.

The saturation level is realized at the time T1 in the case (a) and the time T2 in the case (b).

On the other hand, for the short-time exposure pixel,
in the case (a) in which there is no change in brightness, a pixel value increases at the same slope as the long-time exposure pixel, and in the example shown in FIG. 9, the final pixel value reaches 320.

On the other hand, in the case (b), the slope becomes smaller than that of the long-time exposure pixel, and in the example of FIG. 9, the final pixel value becomes 80.

In this way, by a change in brightness in a photographing environment, there is a case in which the pixel value of only one of the long-time exposure pixel and the short-time exposure pixel greatly changes.

The case (b) is an example in which, in a bright background, a moving subject has moved a pixel area of a photographed image, e.g., when a car crosses.

The comparison data of the blending ratio described above corresponding to cases in which there is a change in such pixel brightness and in which there is no change in such pixel brightness, that is, $$\alpha = \alpha L \times \alpha S$$

a blending ratio according to the present disclosure described above, and
a blending ratio of the related art depending only on the pixel value of a long-time exposure pixel applied to typical blending: αL is described with reference to FIGS. 10 to 12.

Figure 10:
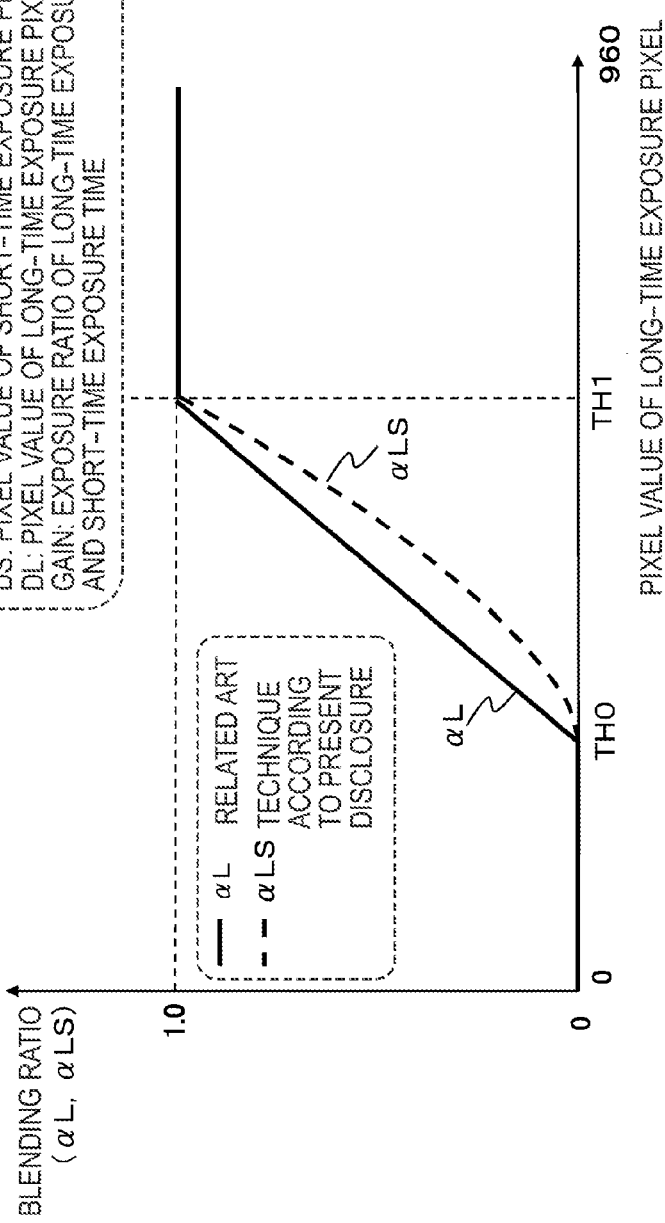
FIG. 10 is a diagram for describing an effect of applying the blending ratio $\alpha=\alpha L \times \alpha S$.
Figure 11:
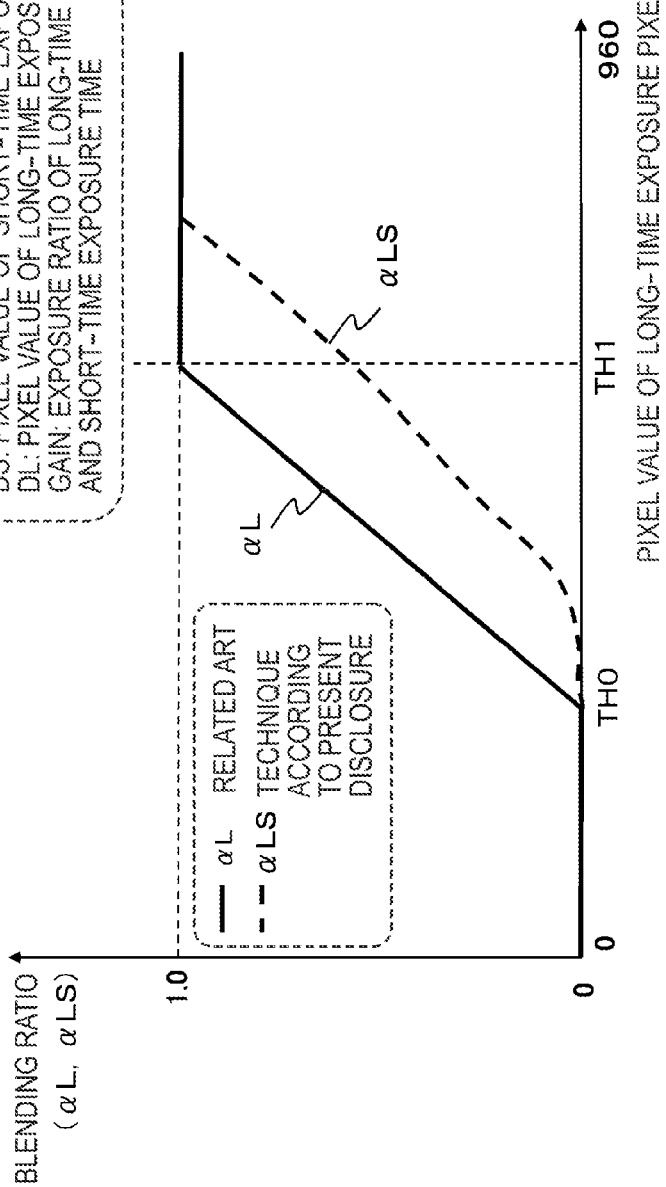
FIG. 11 is a diagram for describing an effect of applying the blending ratio $\alpha=\alpha L \times \alpha S$.
Figure 12:
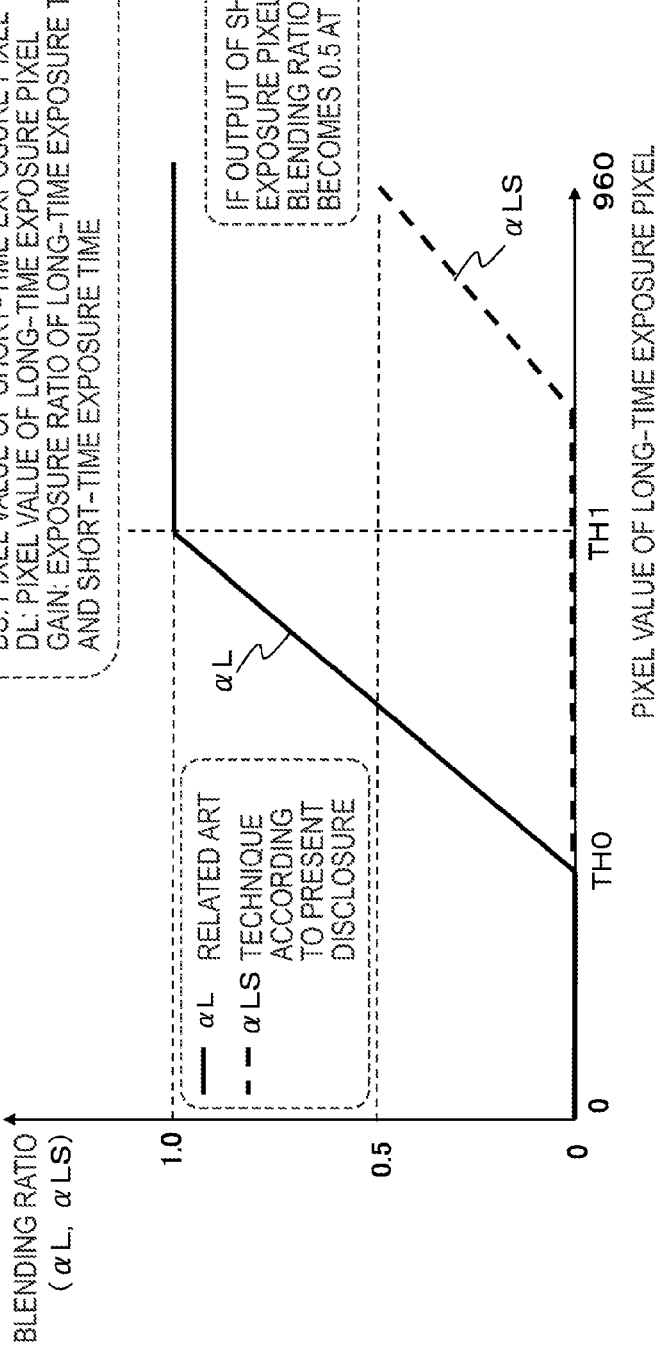
FIG. 12 is a diagram for describing an effect of applying the blending ratio $\alpha=\alpha L \times \alpha S$.

Further, in FIGS. 10 to 12,
a blending ratio according to the present disclosure is noted as αLS (=αL×αS),
a blending ratio of the related art depending only on the pixel value of a typical long-time exposure pixel is noted as αL.

FIG. 10 is a graph representing two blending ratios of cases in which images in a photographing environment without a change in brightness in FIG. 9 (*a*) are photographed as comparison data, that is
a blending ratio according to the present disclosure: αLS (=αL×αS),
a blending ratio of the related art depending only on the pixel value of a long-time exposure pixel: αL.

A horizontal axis represents the pixel value of the long-time exposure pixel and a vertical axis represents blending ratios: αLS, αL.

That is, the example shown in FIG. 10 is an example of a case in which $$DS = (DL/GAIN)$$

where
DS: a pixel value of the short-time exposure pixel,
DL: a pixel value of the long-time exposure pixel,
GAIN: an exposure ratio of a long-time exposure pixel time and a short-time exposure pixel time.

The data of the blending ratio αL of the related art depending only on the pixel value of a long-time exposure pixel shown as a solid line in a graph in FIG. 10 is the same data as shown in FIG. 7 described previously.

On the other hand, the blending ratio according to the present disclosure shown as a dotted line in a graph in FIG. 10: αLS is αL×αS as the result of the above operation.

To compare both types of data, the blending ratio according to the present disclosure: αLS is set to be lower than the blending ratio of the related art shown as a solid line: αL between threshold values TH0 to TH1, as understood from the graph in FIG. 10.

In other words, this means that a lower blending ratio than the blending ratio of the related art shown as a solid line: αL is applied if the blending ratio according to the present disclosure: αLS has been applied between threshold values TH0 to TH1.

The blending ratio α is used as
the pixel value of intermediate data=α×(the pixel value of a short-time exposure pixel)×GAIN+(1.0−α)×(the pixel value of a long-time exposure pixel), as described previously.

Accordingly, if applying the blending ratio according to the present disclosure: αLS, the blending ratio of a short-time exposure pixel will be set to be lower than the blending ratio of the related art represented as a solid line: αL, and the blending ratio of a long-time exposure pixel will be set to be higher than the blending ratio of the related art represented as a solid line: αL.

In other words, this means that the weight of the long-time exposure pixel becomes high.

FIG. 11 is a graph representing two blending ratios in a case in which an image is photographed in a photographing environment in FIG. 9 (*b*), that is, data of a case in which the pixel value of a short-time exposure pixel becomes smaller due to the influence of a moving subject crossing in a short-time exposure period.

The graph represents
a blending ratio according to the present disclosure: αLS (=αL×αS),
a blending ratio of the related art depending only on the pixel value of a long-time exposure pixel: αL,
as comparison data.

A horizontal axis represents the pixel value of the long-time exposure pixel and a vertical axis represents blending ratios: αLS, αL.

That is, the example represented in FIG. 11 is an example of a case in which $$DS = (DL/GAIN) \times 0.75$$

where
DS: a pixel value of the short-time exposure pixel,
DL: a pixel value of the long-time exposure pixel,
GAIN: an exposure ratio of a long-time exposure pixel time and a short-time exposure pixel time.

In other words, the pixel value of the short-time exposure pixel: DS becomes smaller by a factor of 0.75 in comparison with a case in which there is no change in brightness.

To compare both types of data represented in FIG. 11, the blending ratio according to the present disclosure: αLS is set to be lower than the blending ratio of the related art represented as a solid line: αL between threshold values TH0 to TH1, particularly in a part exceeding the threshold value TH1.

In other words, this means that a lower blending ratio than the blending ratio of the related art represented as a solid line: αL is applied if the blending ratio according to the present disclosure: αLS has been applied between threshold values TH0 to TH1, particularly in certain sections exceeding the threshold value TH1.

The blending ratio α is used as
the pixel value of intermediate data=α×(the pixel value of a short-time exposure pixel)×GAIN+(1.0−α)×(the pixel value of a long-time exposure pixel), as described above.

Accordingly, if applying the blending ratio according to the present disclosure: αLS, the blending ratio of a short-time exposure pixel will be set to be lower than the blending ratio of the related art represented as a solid line: αL, and the blending ratio of a long-time exposure pixel will be set to be higher than the blending ratio of the related art represented as a solid line: αL.

A degree of increasing the blending ratio of the long-time exposure pixel becomes greater than that in the case in FIG. 10 described previously (a case in which there is no change in brightness).

This example corresponds to a case in which it suddenly gets dark due to the influence of a moving subject crossing and the moving subject is photographed when the exposure period of the short-time exposure pixel is dark, in FIG. 9 (*b*).

In this case, the short-time exposure pixel has a pixel value obtained in an environment in which it suddenly gets dark due to the influence of the moving subject and enables a subject different from a photographing subject of the long-time exposure pixel to be photographed. In such a case, by lowering the weight (blending ratio) of the pixel value of the short-time exposure pixel, the weight (blending ratio) of the pixel value of the long-time exposure pixel is set to be high, and blending is carried out to set an output pixel value (in this example, the pixel value of intermediate data).

Through such a configuration, the calculation of a combining pixel value by blending, which reduces an influence due to a change in a photographing environment, such as the influence by a moving subject, is realized.

FIG. 12 is a graph representing two blending ratios of a case in which an image is photographed in a photographing environment in FIG. 9 (b), that is, data of a case in which the pixel value of a short-time exposure pixel becomes smaller due to the influence of a moving subject crossing in a short-time exposure period, like FIG. 11.

However, this case has a more intense change in luminance than the example represented in FIG. 11:

$$DS=(DL/GAIN)\times 0.5.$$

In other words, the pixel value of the short-time exposure pixel: DS becomes smaller by a factor of 0.5, that is, is halved, in comparison with a case in which there is no change in brightness.

To compare both types of data represented in FIG. 12, the blending ratio according to the present disclosure: $\alpha LS$ is set to be lower than the blending ratio of the related art represented as a solid line: $\alpha L$ between threshold values TH0 to TH1, particularly in a majority of areas exceeding the threshold value TH1.

In other words, this means that a lower blending ratio than the blending ratio of the related art represented as a solid line: $\alpha L$ is applied if the blending ratio according to the present disclosure: $\alpha LS$ has been applied between threshold values TH0 to TH1, in particular in certain sections exceeding the threshold value TH1.

The blending ratio $\alpha$ is used as the pixel value of intermediate data=$\alpha\times$(the pixel value of a short-time exposure pixel)$\times$GAIN+(1.0−$\alpha$)$\times$(the pixel value of a long-time exposure pixel), as described above.

Accordingly, if applying the blending ratio according to the present disclosure: $\alpha LS$, the blending ratio of a short-time exposure pixel will be set to be lower than the blending ratio of the related art represented as a solid line: $\alpha L$, and the blending ratio of a long-time exposure pixel will be set to be higher than the blending ratio of the related art represented as a solid line: $\alpha L$.

A degree of increasing the blending ratio of the long-time exposure pixel becomes greater than those in the cases of FIGS. 10 and 11 described previously.

Further, if the output of the short-time exposure pixel is small, the blending ratio $\alpha LS$ increases to 0.5.

In this way, if brightness in a photographing environment has changed, the blending ratio of the present disclosure, $$\alpha=\alpha L\times\alpha S$$

becomes a value different from a typical blending ratio $\alpha L$ that is frequently used in the related art.

In particular, an adjustment is made in such a manner that, if a photographing environment in a short-time exposure period as shown in FIG. 9 (b) gets dark, the blending ratio of the short-time exposure pixel is lowered, and the blending ratio of the long-time exposure pixel is increased.

By such a configuration, the calculation of a combining pixel value by blending, which reduces an influence due to a change in a photographing environment, such as the influence by a moving subject, is realized.

5-3. Embodiment 2

Example in which Exposure Time is Changed for Each Column in Bayer Array

An example in which an exposure time is changed for each column in a Bayer array is represented in FIG. 13.

In FIG. 13, the following three types of data are represented:

(2a) image pickup data (2b) intermediate data (2c) output data (2a) image pickup data is for an image pickup element and represents an image photographed when an exposure time is changed for each column in a Bayer array.

White parts are long-time exposure pixels and deep gray parts represent short-time exposure pixels.

In this example, a long-time exposure pixel and a short-time exposure pixel are alternately set on a two-column basis.

Further, such exposure time control is carried out based on the control of, for example, the control unit 105.

(2a) image pickup data represents 4×4 pixel areas.

(2b) intermediate data is produced at the pixel information combining unit 162 based on the 4×4 (2a) image pickup data.

The pixel information combining unit 162 first calculates the 4×2 intermediate pixel data based on the 4×4 (2a) image pickup data in step 1.

(2c) output data is produced at the pixel information combining unit 162 based on the 4×2 (2b) intermediate data.

The pixel information combining unit 162 first calculates the 4×2 (2b) intermediate pixel data based on the 4×4 (2a) image pickup data in step 1, and produces 2×2 (2c) output data based on the produced intermediate data in step 2.

(2c) output data is produced as a wide dynamic image.

In this way, the pixel information combining unit 162 calculates each pixel value of the component pixel of 2×2 (2c) output data, by blending the pixel values of a long-time exposure pixel and a short-time exposure pixel that are included in the 4×4 (2a) image pickup data.

Each of step 1 and step 2 will be described.

(Step 1)

The producing of (2b) intermediate data from (2a) image pickup data in step 1 is carried out by blending a plurality of pixel values below.

The blending is carried out individually for a GR/GB phase and for an R/B phase.

(Processing in GR/GB Phase)

For example, the pixel value (GW00) of GW00 represented in FIG. 13 (2b) is calculated through the following expression in which the pixel values of a plurality of pixels included in (2a) image pickup data and a blending ratio $\alpha$ are applied.

$$GW00=\alpha\times GS00\times GAIN+(1.0-\alpha)\times GL02$$

Here,

GAIN: a gain by which a pixel value of a short-time exposure pixel is multiplied (an exposure ratio of a long-time exposure pixel and a short-time exposure pixel)

$\alpha$: a blending ratio of the pixel value of the long-time exposure pixel and the pixel value of the short-time exposure pixel.

Here, the blending ratio α is calculated as the product of the following two blending ratios, αL and αS.

$$αL=\text{CalcBrate}(GL02,THR0\_LNG,THR1\_LNG)$$

$$αS=\text{CalcBrate}(GS00,THR0\_SHT,THR1\_SHT)$$

$$α=αL×αS$$

Here,
the value of CalcBrate(dat, THR0, THR1) is as shown in FIGS. 7 and 8, as described previously:
CalcBrate(dat, THR0, THR1)=0 when dat<THR0,
CalcBrate(dat, THR0, THR1)=(dat−THR0)/(THR1−THR0) when THR0≤dat<THR1,
CalcBrate(dat, THR0, THR1)=1.0 when THR1≤dat.
(Processing in R/B Phase)
For example, the pixel value (BW01) of BW01 represented in FIG. 13 (2b) is calculated through the following expression in which the pixel values of a plurality of pixels included in (2a) image pickup data and a blending ratio α are applied.

$$BW10=α×BS10×\text{GAIN}+(1.0−α)×BL12$$

Here,
GAIN: a gain by which a pixel value of a short-time exposure pixel is multiplied (an exposure ratio of the long-time exposure pixel and the short-time exposure pixel)
α: a blending ratio of the pixel value of the long-time exposure pixel and the pixel value of the short-time exposure pixel Here, the blending ratio α is calculated as the product of the following two blending ratios, αL and αS.

$$αL=\text{CalcBrate}((GL02+GL22)/2.0,THR0\_LNG,THR1\_LNG)$$

$$αS=\text{CalcBrate}((GS00+GS20)/2.0,THR0\_SHT,THR1\_SHT)$$

$$α=αL×αS$$

Here,
the value of CalcBrate(dat, THR0, THR1) is as shown in FIGS. 7 and 8, as described above:
CalcBrate(dat, THR0, THR1)=0 when dat<THR0,
CalcBrate(dat, THR0, THR1)=(dat−THR0)/(THR1−THR0) when THR0≤dat<THR1
CalcBrate(dat, THR0, THR1)=1.0 when THR1≤dat.
(Step 2)
Next, step 2 represented in FIG. 13 will be described. The producing of (2c) output data from (2b) intermediate data in the step 2 is carried out through the vertical addition of a pixel value included in (2b) intermediate data, as will be described.
For example, either of 1:1 addition and 1:3/3:1 addition represented below is applied.
The calculating example of pixel values G00, R01 represented in (2c) output data of FIG. 13 will be described.
(1:1 Addition)
In 1:1 addition, the pixel values G00, R01 represented in (2c) output data are calculated through the following expression.

$$G00=(GW00+GW20)/2$$

$$R01=(RW01+RW21)/2$$

(1:3/3:1 Addition)
In 1:3 or 3:1 addition, the pixel values G00, R01 represented in (2c) output data are calculated through the following expressions.

$$G00=(3×GW00+GW20)/4$$

$$R01=(RW01+3×RW21)/4$$

5-4. Embodiment 3

Example in which Exposure Time is Changed Diagonally in Bayer Array

An example in which an exposure time is changed diagonally in a Bayer array is represented in FIG. 14.
In FIG. 14, the following three types of data are represented:
(3a) image pickup data
(3b) intermediate data
(3c) output data
(3a) image pickup data is for an image pickup element and represents an image photographed when an exposure time is changed diagonally in a Bayer array.
White parts are long-time exposure pixels and deep gray parts represent short-time exposure pixels.
In this example, a long-time exposure pixel and a short-time exposure pixel are alternately set on a four-pixel block basis.
Further, such exposure time control is carried out based on the control of, for example, the control unit 105.
(3a) image pickup data represents 4×4 pixel areas.
(3b) intermediate data is produced at the pixel information combining unit 162 based on the 4×4 (3a) image pickup data.
The pixel information combining unit 162 first calculates 4×2 intermediate pixel data based on the 4×4 (3a) image pickup data in step 1.
(3c) output data is produced at the pixel information combining unit 162 based on the 4×2 (3b) intermediate pixel data.
The pixel information combining unit 162 first calculates the 4×2 (3b) intermediate pixel data based on the 4×4 (3a) image pickup data in step 1, and produces 2×2 (3c) output data based on the produced intermediate data in step 2.
(3c) output data is produced as a wide dynamic image.
In this way, the pixel information combining unit 162 calculates each pixel value of the component pixel of 2×2 (3c) output data, by blending the pixel values of a long-time exposure pixel and a short-time exposure pixel that are included in the 4×4 (3a) image pickup data.
Each of step 1 and step 2 will be described.
(Step 1)
The producing of (3b) intermediate data from (3a) image pickup data in step 1 is carried out by blending a plurality of pixel values below.
The blending is carried out individually for a GR/GB phase and for an R/B phase.
(Processing in GR/GB Phase)
For example, the pixel value (GW00) of GW00 represented in the FIG. 14 (3b) is calculated through the following expression in which the pixel values of a plurality of pixels included in (3a) image pickup data and a blending ratio α are applied.

$$GW00=α×GS00×\text{GAIN}+(1.0−α)×GL02$$

Here,
GAIN: a gain by which a pixel value of a short-time exposure pixel is multiplied (an exposure ratio of a long-time exposure pixel and a short-time exposure pixel)

α: a blending ratio of the pixel value of the long-time exposure pixel and the pixel value of the short-time exposure pixel.

Here, the blending ratio α is calculated as the product of the following two blending ratios, αL and αS.

$$\alpha L = CalcBrate(GL02, THR0\_LNG, THR1\_LNG)$$

$$\alpha S = CalcBrate(GS00, THR0\_SHT, THR1\_SHT)$$

$$\alpha = \alpha L \times \alpha S$$

Here,
the value of CalcBrate(dat, THR0, THR1) is as shown in FIGS. 7 and 8, as described previously:
CalcBrate(dat, THR0, THR1)=0 when dat<THR0,
CalcBrate(dat, THR0, THR1)=(dat−THR0)/(THR1−THR0) when THR0≤dat<THR1,
CalcBrate(dat, THR0, THR1)=1.0 when THR1≤dat.
(Processing in R/B Phase)
For example, the pixel value (BW12) of BW12 represented in FIG. 14 (3*b*) is calculated through the following expression in which the pixel values of a plurality of pixels included in (3*a*) image pickup data and a blending ratio α are applied.

$$BW12 = \alpha \times BS12 \times GAIN + (1.0 - \alpha) \times BL32$$

Here,
GAIN: a gain by which a pixel value of a short-time exposure pixel is multiplied (an exposure ratio of a long-time exposure pixel and a short-time exposure pixel)
α: a blending ratio of the pixel value of the long-time exposure pixel and the pixel value of the short-time exposure pixel.

Here, the blending ratio α is calculated as the product of the following two blending ratios, αL and αS.

$$\alpha L = (CalcBrate(GS11, THR0\_SHT, THR1\_SHT) + CalcBrate(GL13, THR0\_LNG, THR1\_LNG))/2.0$$

$$\alpha S = (CalcBrate(GL31, THR0\_LNG, THR1\_LNG) + CalcBrate(GS33, THR0\_SHT, THR1\_SHT))/2.0$$

$$\alpha = \alpha L \times \alpha S$$

Here,
the value of CalcBrate(dat, THR0, THR1) is as shown in FIGS. 7 and 8, as described above:
CalcBrate(dat, THR0, THR1)=0 when dat<THR0,
CalcBrate(dat, THR0, THR1)=(dat−THR0)/(THR1−THR0) when THR0≤dat<THR1,
CalcBrate(dat, THR0, THR1)=1.0 when THR1≤dat.
(Step 2)
Next, step 2 represented in FIG. 14 will be described. The producing of (3*c*) output data from (3*b*) intermediate data in step 2 is carried out through the horizontal addition of a pixel value included in (3*b*) intermediate data, as will be described.

For example, either of 1:1 addition and 1:3/3:1 addition represented below is applied.
(1:1 Addition)
In 1:1 addition, the pixel values G00 and R01 represented in (3*c*) output data are calculated through the following expressions.

$$G00 = (GW00 + GW02)/2$$

$$R01 = (RW01 + RW03)/2$$

(1:3/3:1 Addition)
In 1:3 or 3:1 addition, the pixel values G00 and R01 represented in (3*c*) output data are calculated through the following expressions.

$$G00 = (3 \times GW00 + GW02)/4$$

$$R01 = (RW01 + 3 \times RW03)/4$$

5-5. Embodiment 4

Figure 15:
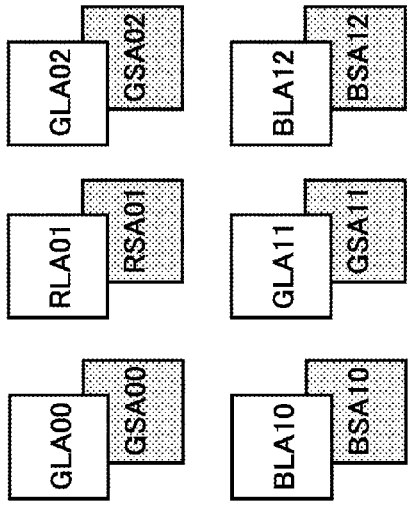
FIG. 15 is a diagram for describing a pixel information combination example.

Example in which Exposure Time is Changed Diagonally in Four-Divisional Bayer Array An example in which an exposure time is changed diagonally in a four-divisional Bayer array is represented in FIG. 15.

In FIG. 15, the following three types of data are represented:
(4*a*) image pickup data
(4*b*) intermediate data
(4*c*) output data
(4*a*) image pickup data is for an image pickup element and represents an image photographed when an exposure time is changed diagonally in a four-divisional Bayer array.

White parts are long-time exposure pixels and deep gray parts represent short-time exposure pixels.

In this example, a long-time exposure pixel and a short-time exposure pixel are alternately set diagonally.

Further, such exposure time control is carried out based on the control of, for example, the control unit 105.

(4*a*) image pickup data represents 4×6 pixel areas.

(4*b*) intermediate data is produced at the pixel information combining unit 162 based on 4×6 (4*a*) image pickup data.

The pixel information combining unit 162 first calculates 12 items of intermediate pixel data based on the 4×6 (4*a*) image pickup data in a step 1.

(4*c*) output data is produced at the pixel information combining unit 162 based on the 12 items of (4*b*) intermediate pixel data.

The pixel information combining unit 162 first calculates the 12 items of (4*b*) intermediate pixel data based on the 4×6 (4*a*) image pickup data in step 1, and produces 2×3 (4*c*) output data based on the produced intermediate data in step 2.

(4*c*) output data is produced as a wide dynamic image.
Each of steps 1 and 2 will be described.
(Step 1)
The producing of (4*b*) intermediate data from (4*a*) image pickup data in step 1 is carried out through the diagonal addition of a plurality of pixel values below.

For example, the pixel value (GLA00) of GLA00 and the pixel value (GSA00) of GSA00 represented in the FIG. 15 (4*b*) are calculated through diagonal addition according to the following expressions in which the pixel values of a plurality of pixels included in (4*a*) image pickup data and a blending ratio α are applied.

$$GLA00 = (GL00 + GL11)/2$$

$$GSA00 = (GS01 + GS10)/2$$

(Step 2)
Next, step 2 represented in FIG. 15 will be described. The producing of (4*c*) output data from (4*b*) intermediate data in step 2 is carried out by blending pixel values included in (4*b*) intermediate data, as will be described.

The blending is carried out individually for a GR/GB phase and for an R/B phase.

(Processing in GR/GB Phase)

For example, the pixel value (G00) of G00 represented in the FIG. 15 (4c) is calculated through the following expression in which the pixel values of a plurality of pixels included in (4b) intermediate data and a blending ratio α are applied.

$$G00=\alpha \times GSA00 \times GAIN+(1.0-\alpha) \times GLA00$$

Here,

GAIN: a gain by which a pixel value of a short-time exposure pixel is multiplied (an exposure ratio of a long-time exposure pixel and a short-time exposure pixel)

α: a blending ratio of the pixel value of the long-time exposure pixel and the pixel value of the short-time exposure pixel.

Here, the blending ratio α is calculated as the product of the following two blending ratios, αL and αS.

$$\alpha L = \text{CalcBrate}(GLA00, THR0\_LNG, THR1\_LNG)$$

$$\alpha S = \text{CalcBrate}(GSA00, THR0\_SHT, THR1\_SHT)$$

$$\alpha = \alpha L \times \alpha S$$

Here, the value of CalcBrate(dat, THR0, THR1) is as shown in FIGS. 7 and 8, as described previously:

CalcBrate(dat, THR0, THR1)=0 when dat<THR0,

CalcBrate(dat, THR0, THR1)=(dat−THR0)/(THR1−THR0) when THR0≤dat<THR1,

CalcBrate(dat, THR0, THR1)=1.0 when THR1≤dat.

(Processing in R/B Phase)

For example, the pixel value (R01) of R01 represented in FIG. 15 (4c) is calculated through the following expression in which the pixel values of a plurality of pixels included in (4b) intermediate data and a blending ratio α are applied.

$$R01=\alpha \times RSA01 \times GAIN+(1.0-\alpha) \times RLA01$$

Here,

GAIN: a gain by which a pixel value of a short-time exposure pixel is multiplied (an exposure ratio of a long-time exposure pixel and a short-time exposure pixel)

α: a blending ratio of the pixel value of the long-time exposure pixel and the pixel value of the short-time exposure pixel Here, the blending ratio α is calculated as the product of the following two blending ratios, αL and αS.

$$\alpha L = \text{CalcBrate}((GLA00+GLA02)/2.0, THR0\_LNG, THR1\_LNG)$$

$$\alpha S = \text{CalcBrate}((GSA00+GSA02)/2.0, THR0\_SHT, THR1\_SHT)$$

$$\alpha = \alpha L \times \alpha S$$

Here, the value of CalcBrate(dat, THR0, THR1) is as shown in FIGS. 7 and 8, as described above:

CalcBrate(dat, THR0, THR1)=0 when dat<THR0,

CalcBrate(dat, THR0, THR1)=(dat−THR0)/(THR1−THR0) when THR0≤dat<THR1

CalcBrate(dat, THR0, THR1)=1.0 when THR1≤dat.

Further, the producing of the output pixel value described in the practical examples above may be performed by the pixel information combining unit 162 in the image pickup device 102 in FIG. 4 and may be performed by the signal processing unit 103 in FIG. 3.

Further, it is possible to perform the exposure time control or the operation described in the practical examples above through a program that is performed in e.g. a control unit.

6. Other Examples of Configuration of Image Processing Apparatus

First, although the image processing apparatus in the present disclosure as described with reference to FIG. 3 can have the configuration as represented in FIG. 3, it may also have other configurations.

Figure 16:
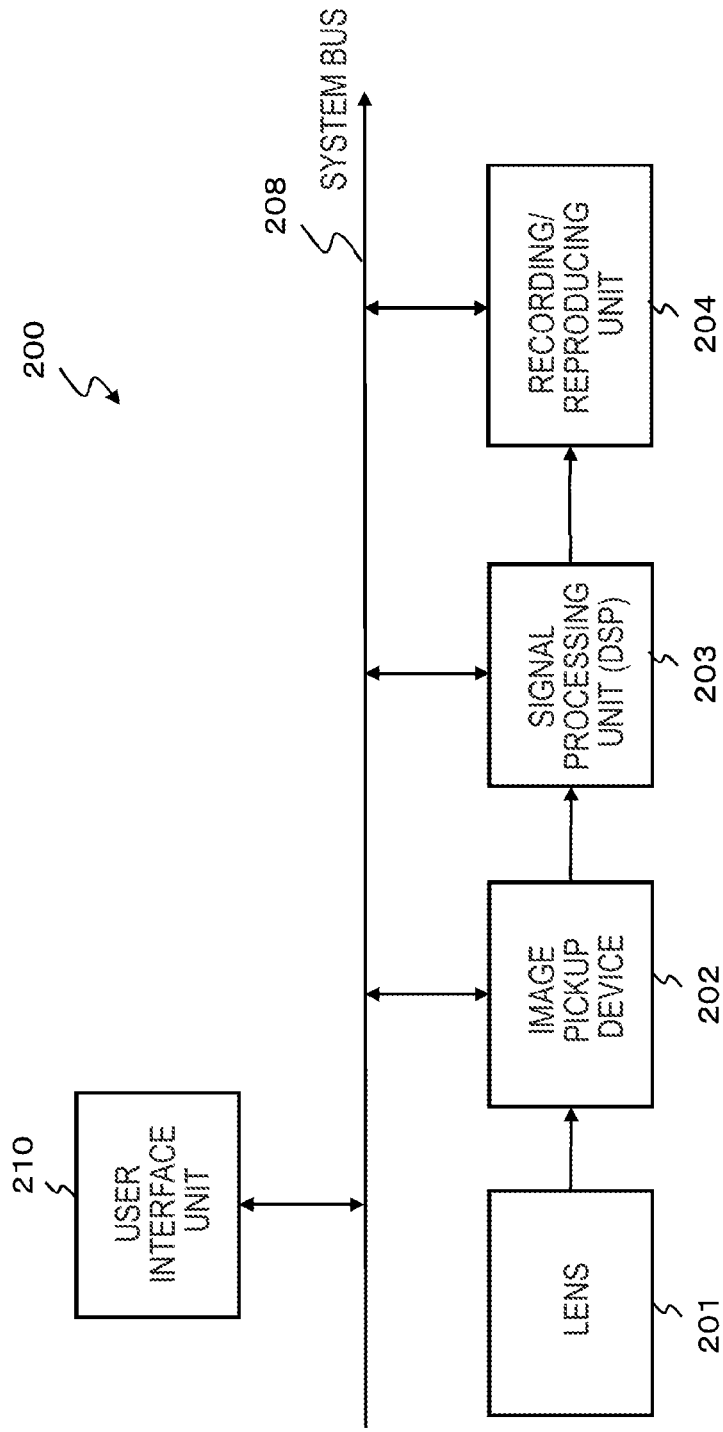
FIG. 16 is a diagram for describing an example of a configuration of an image processing apparatus.

FIG. 16 shows an image processing apparatus that includes a lens 201, an image pickup device 202, a signal processing unit (DSP) 203, a recording/reproducing unit 204, a user interface unit 210, and a system bus 208.

The flow of processing is as follows. When image pickup starts with pressing of a shutter (user interface unit 210), the solid-state image pickup element (e.g., a CCD (Charge Coupled Device) or a CMOS (Complementary Metal Oxide Semiconductor)) of the image pickup device 202 converts optical images incident from the lens 201 (optics) into 2D electrical signals (hereinafter referred to as image data).

Output is, for example, RAW images picked up by spatially changing an exposure time as described with reference to FIG. 5 above. Then, signal processing is carried out in the following order.

(1) Wide D combination+pixel addition (practical examples 1 to 4 by an array, an exposure technique)

(2) Camera signal processing (white balance, demosaicing, gamma correction, etc.)

(3) Data compression (JPEG, etc. for a still image, H.264, etc. for a video)

The signal processing of (1) to (3) above may be carried out with either of the image pickup device 202 and the signal processing unit 203. Further, if pixel addition (vertical addition, horizontal addition, diagonal addition) is carried out in the image pickup element, analog addition (FD (Floating Diffusion) addition, SF (Source Follower) addition), digital addition, etc. can be applied.

In addition, the order of steps 1 and 2 in the embodiments 1 to 3 described previously can be switched. The image produced as an output image is kept in the recording/reproducing unit 204 as compressed data.

7. Conclusion of Constitution of Present Disclosure

So far, the embodiment of the present disclosure has been described in detail with reference to a specific embodiment. However, it should be noted that various variations and alternative embodiments will become apparent to those skilled in the art without departing from the scope of the present disclosure. That is, it should be noted that the present disclosure is disclosed through embodiments and is not construed in a manner limited by these embodiments. In order to determine the scope of the present disclosure, it is necessary to consider the scope of the claims.

Additionally, the present technology may also be configured as below.

(1) An image processing apparatus comprising an image information combining unit that performs a pixel value combining process on a long-time exposure pixel and a short-time exposure pixel, wherein the pixel information combining unit calculates a plurality of blending ratios based on pixel values of a plurality of pixels of different periods of exposure time, determines an applied blending ratio, which is applied to a blending process for the long-time exposure pixel and the short-time exposure pixel, based on the plurality of blending ratios, and determines pixel values of an output image or an intermediate image which is applied to produce the output image, by the blending process for the long-time exposure pixel and the short-time exposure pixel to which the applied blending ratio is applied.

(2) The image processing apparatus according to (1), wherein the pixel information combining unit calculates the plurality of blending ratios based on the pixel values of the plurality of pixels of different periods of exposure time to be blended, and determines the applied blending ratio based on the calculated plurality of blending ratios.

(3) The image processing apparatus according to (1) or (2), wherein the pixel information combining unit calculates the plurality of blending ratios based on pixel values of pixels adjacent to the plurality of pixels of different periods of exposure time to be blended, and determines the applied blending ratio based on the calculated plurality of blending ratios.

(4) The image processing apparatus according to any one of (1) to (3),
wherein the pixel information combining unit calculates
a long-time exposure pixel value dependent blending ratio $\alpha L$ that is dependent on the pixel value of the long-time exposure pixel, and
a short-time exposure pixel value dependent blending ratio $\alpha S$ that is dependent on the pixel value of the short-time exposure pixel, and
determines the product of the calculated long-time exposure pixel value dependent blending ratio $\alpha L$ and the calculated short-time exposure pixel value dependent blending ratio $\alpha S$, that is, $$\alpha = \alpha L \times \alpha S,$$

the $\alpha$ is determined as the applied blending ratio representing a blending amount of the short-time exposure pixel.

(5) The image processing apparatus according to (4),
wherein the pixel information combining unit determines
the long-time exposure pixel dependent blending ratio $\alpha L$ such that
depending on a pixel value CL of a long-time exposure pixel of a color C as a pixel to be blended,
$\alpha L = 0$ when $CL < TH0L$,
$\alpha L = (CL - TH0L)/(TH1L - TH0L)$ when $TH0L \leq CL \leq TH1L$, and
$\alpha L = 1.0$ when $TH1L < CL$, and
the short-time exposure pixel dependent blending ratio $\alpha S$ such that
depending on a pixel value CS of the short-time exposure pixel of the color C as the pixel to be blended,
$\alpha S = 0$ when $CS < TH0S$,
$\alpha L = (CL - TH0S)/(TH1S - TH0S)$ when $TH0S \leq CS \leq TH1S$, and
$\alpha L = 1.0$ when $TH1S < CL$,
wherein TH0L, TH1L, TH0S, and TH1S are predefined threshold values.

(6) The image processing apparatus according to any one of (1) to (5), wherein
the pixel information combining unit calculates
a pixel value CW of a color C of the output image or the intermediate image through the following expression $$CW = \alpha \times CS \times GAIN + (1.0 - \alpha) \times CL$$

where
CL is a pixel value of a long-time exposure pixel of the color C,
CS is a pixel value of a short-time exposure pixel of the color C,
GAIN is an exposure ratio of a long-time exposure pixel and a short-time exposure pixel, and
$\alpha$ is the applied blending ratio.

(7) The image processing apparatus according to any one of (1) to (6), wherein
the pixel information combining unit produces the intermediate image by the blending process for the long-time exposure pixel and the short-time exposure pixel to which the applied blending ratio is applied, and
produces a final output image by the blending process for pixel values of the same color composing the produced intermediate image.

(8) The image processing apparatus according to any one of (1) to (7), wherein
the pixel information combining unit receives image data with an RGB array in which the long-time exposure pixel and the short-time exposure pixel are mixed, and determines the pixel values of the output image or the intermediate image by blending the long-time exposure pixel and the short-time exposure pixel whose colors are the same, for each color of RGB.

(9) The image processing apparatus according to (8), wherein
the pixel information combining unit determines the applied blending ratio by applying only G pixel data of the image data with the RGB array.

Further, a method of a process executed in the aforementioned apparatus or system, a program for executing a process, and a recording medium having the program recorded thereon are all included in the configuration of the present disclosure.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program. For example, the program can be installed in advance in a storage medium. In addition to being installed in a computer from the storage medium, the program can also be received through a network, such as a local area network (LAN) or the Internet, and can be installed in a storage medium such as a hard disk or the like that is built into the computer.

Note that the various types of processing that are described in this specification may not only be performed in a temporal sequence as has been described, but may also be performed in parallel or individually, in accordance with the processing capacity of the device that performs the processing or as needed. Furthermore, the system in this specification is not limited to being a configuration that logically aggregates a plurality of devices, all of which are contained within the same housing.

As described above, according to practical examples of the present disclosure, an apparatus and a method that combine the pixel values of a long-time exposure pixel and a short-time exposure pixel and produce a wide dynamic range image are realized.

In particular, for example, an image information combining unit that combines the pixel values of a long-time exposure pixel and a short-time exposure pixel and produces the pixel values of an output image is included. The pixel information combining unit determines the pixel values of the output image by calculating a plurality of blending ratios calculated based on the pixel values of a plurality of different pixels by determining the final blending ratio of the final long-time exposure pixel and the final short-time exposure pixel based on the plurality of blending ratios and by blending a long-time exposure pixel and a short-time exposure pixel to which the final blending ratio is applied. It is possible to produce a wide dynamic range image through such processing.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-190051 filed in the Japan Patent Office on Aug. 31, 2011 and Japanese Priority Patent Application JP 2011-290257 filed in the Japan Patent Office on Dec. 29, 2011, the entire content of which is hereby incorporated by reference.

What is claimed is:

1. An image processing apparatus comprising:
a pixel unit including a plurality of pixels to conduct long-time exposure and a plurality of pixels to conduct short-time exposure,
an operating unit comprising a pixel information combining unit that performs a pixel value combining process on a long-time exposure pixel and a short-time exposure pixel,
wherein the pixel information combining unit calculates a plurality of blending ratios based on pixel values of a plurality of pixels of different periods of exposure time, determine an applied blending ratio, which is applied to a blending process for the long-time exposure pixel and the short-time exposure pixel, by combining at least two of the plurality of blending ratios, and determine pixel values of an output image or an intermediate image which is applied to produce the output image, by the blending process for the long-time exposure pixel and the short-time exposure pixel to which the applied blending ratio is applied,
wherein the operating unit outputs the output image to a signal processing unit.

2. The image processing apparatus according to claim 1, wherein the pixel information combining unit is further configured to calculate the plurality of blending ratios based on the pixel values of the plurality of pixels of different periods of exposure time to be blended, and to determine the applied blending ratio based on the calculated plurality of blending ratios.

3. The image processing apparatus according to claim 1, wherein the pixel information combining unit is further configured to calculate the plurality of blending ratios based on pixel values of pixels adjacent to the plurality of pixels of different periods of exposure time to be blended, and to determine the applied blending ratio based on the calculated plurality of blending ratios.

4. The image processing apparatus according to claim 1, wherein the pixel information combining unit is further configured to calculate
a long-time exposure pixel value dependent blending ratio $\alpha L$ that is dependent on the pixel value of the long-time exposure pixel, and a short-time exposure pixel value dependent blending ratio $\alpha S$ that is dependent on the pixel value of the short-time exposure pixel, and
to determine the product of the calculated long-time exposure pixel value dependent blending ratio $\alpha L$ and the calculated short-time exposure pixel value dependent blending ratio $\alpha S$, that is, $$\alpha = \alpha L \times \alpha S,$$

the $\alpha$ is determined as the applied blending ratio representing a blending amount of the short-time exposure pixel.

5. The image processing apparatus according to claim 4, wherein the pixel information combining unit is further configured to determine the long-time exposure pixel dependent blending ratio $\alpha L$ such that
depending on a pixel value CL of a long-time exposure pixel of a color C as a pixel to be blended,
$\alpha L=0$ when $CL<TH0L$,
$\alpha L=(CL-TH0L)/(TH1L-TH0L)$ when $TH0L \leq CL \leq TH1L$, and
$\alpha L=1.0$ when $TH1L<CL$, and
the short-time exposure pixel dependent blending ratio $\alpha S$ such that depending on a pixel value CS of the short-time exposure pixel of the color C as the pixel to be blended,
$\alpha S=0$ when $CS<TH0S$,
$\alpha L=(CL-TH0S)/(TH1S-TH0S)$ when $TH0S \leq CS \leq TH1S$, and
$\alpha L=1.0$ when $TH1S<CL$,
wherein TH0L, TH1L, TH0S, and TH1S are predefined threshold values.

6. The image processing apparatus according to claim 1, wherein the pixel information combining unit is further configured to calculate a pixel value CW of a color C of the output image or the intermediate image through the following expression $$CW = \alpha \times CS \times GAIN + (1.0 - \alpha) \times CL$$

where
CL is a pixel value of a long-time exposure pixel of the color C,
CS is a pixel value of a short-time exposure pixel of the color C,
GAIN is an exposure ratio of a long-time exposure pixel and a short-time exposure pixel, and
$\alpha$ is the applied blending ratio.

7. The image processing apparatus according to claim 1, wherein the pixel information combining unit is further configured to produce the intermediate image by the blending process for the long-time exposure pixel and the short-time exposure pixel to which the applied blending ratio is applied, and
to produce a final output image by the blending process for pixel values of the same color composing the produced intermediate image.

8. The image processing apparatus according to claim 1, wherein the pixel information combining unit is further configured to receive image data with an RGB array in which the long-time exposure pixel and the short-time exposure pixel are mixed, and to determine the pixel values of the output image or the intermediate image by blending the long-time exposure pixel and the short-time exposure pixel whose colors are the same, for each color of RGB.

9. The image processing apparatus according to claim 8, wherein the pixel information combining unit is further configured to determine the applied blending ratio by applying only G pixel data of the image data with the RGB array.

10. An image processing method performed in an image processing apparatus, the method comprising:

accumulating, with a pixel unit including a plurality of pixels to conduct long-time exposure and a plurality of pixels to conduct short-time exposure, charges in each of the pixels based on subject light, performing, with a pixel information combining unit that is part of an operating unit, a pixel value combining process on a long-time exposure pixel and a short-time exposure pixel, wherein the pixel value combining process includes processes of:

calculating a plurality of blending ratios based on pixel values of a plurality of pixels of different periods of exposure time;

determining an applied blending ratio, which is applied to a blending process for the long-time exposure pixel and the short-time exposure pixel, by combining at least two of the plurality of blending ratios; and determining pixel values of an output image or an intermediate image which is applied to the output image through the blending process for the long-time exposure pixel and the short-time exposure pixel to which the applied blending ratio is applied, wherein the operating unit outputs the output image to a signal processing unit.

11. The image processing method according to claim 10, further comprising:

calculating the plurality of blending ratios based on pixel values of pixels adjacent to the plurality of pixels of different periods of exposure time to be blended, and determining the applied blending ratio based on the calculated plurality of blending ratios.

12. The image processing method according to claim 10, further comprising:

calculating a long-time exposure pixel value dependent blending ratio $\alpha L$ that is dependent on the pixel value of the long-time exposure pixel, calculating a short-time exposure pixel value dependent blending ratio $\alpha S$ that is dependent on the pixel value of the short-time exposure pixel, determining the product of the calculated long-time exposure pixel value dependent blending ratio $\alpha L$ and the calculated short-time exposure pixel value dependent blending ratio $\alpha S$, that is, $$\alpha = \alpha L \times \alpha S,$$

the $\alpha$ is determined as the applied blending ratio representing a blending amount of the short-time exposure pixel.

13. The image processing method according to claim 12, further comprising:

determining the long-time exposure pixel dependent blending ratio $\alpha L$ such that depending on a pixel value CL of a long-time exposure pixel of a color C as a pixel to be blended, $\alpha L = 0$ when $CL < TH0L$, $\alpha L = (CL - TH0L)/(TH1L - TH0L)$ when $TH0L \leq CL \leq TH1L$, and $\alpha L = 1.0$ when $TH1L < CL$, and determining the short-time exposure pixel dependent blending ratio $\alpha S$ such that depending on a pixel value CS of the short-time exposure pixel of the color C as the pixel to be blended, $\alpha S = 0$ when $CS < TH0S$, $\alpha L = (CL - TH0S)/(TH1S - TH0S)$ when $TH0S \leq CS \leq TH1S$, and $\alpha L = 1.0$ when $TH1S < CL$, wherein TH0L, TH1L, TH0S, and TH1S are predefined threshold values.

14. The image processing method according to claim 10, further comprising:

calculating a pixel value CW of a color C of the output image or the intermediate image through the following expression $$CW = \alpha \times CS \times GAIN + (1.0 - \alpha) \times CL$$

where

CL is a pixel value of a long-time exposure pixel of the color C,

CS is a pixel value of a short-time exposure pixel of the color C,

GAIN is an exposure ratio of a long-time exposure pixel and a short-time exposure pixel, and $\alpha$ is the applied blending ratio.

15. The image processing method according to claim 10, further comprising:

producing the intermediate image by the blending process for the long-time exposure pixel and the short-time exposure pixel to which the applied blending ratio is applied, and producing a final output image by the blending process for pixel values of the same color comprising the produced intermediate image.

16. The image processing method according to claim 10, further comprising:

receiving image data with an RGB array in which the long-time exposure pixel and the short-time exposure pixel are mixed, and determining the pixel values of the output image or the intermediate image by blending the long-time exposure pixel and the short-time exposure pixel whose colors are the same, for each color of RGB.

17. The image processing method according to claim 16, further comprising:

determining the applied blending ratio by applying only G pixel data of the image data with the RGB array.

18. A non-transitory, computer-readable medium having computer executable instructions stored thereon that, when executed by at least one processor, cause the at least one processor to execute a program for causing a pixel information combining unit of an image processing apparatus to perform a pixel value combining process on a long-time exposure pixel and a short-time exposure pixel, the pixel value combining process including acts of:

receiving image signal data from a pixel unit of that includes a plurality of pixels to conduct long-time exposure and a plurality of pixels to conduct short-time exposure calculating a plurality of blending ratios based on pixel values of a plurality of pixels of different periods of exposure time;

determining an applied blending ratio, which is applied to a blending process for the long-time exposure pixel and the short-time exposure pixel, by combining at least two of the plurality of blending ratios; and determining pixel values of an output image or an intermediate image which is applied to the output image by the blending process for the long-time exposure pixel and the short-time exposure pixel to which the applied blending ratio is applied, outputting pixel values of the output image or the intermediate image to a signal processing unit.

19. The non-transitory, computer-readable medium according to claim 18, wherein the pixel value combining process further includes acts of:

calculating the plurality of blending ratios based on pixel values of pixels adjacent to the plurality of pixels of different periods of exposure time to be blended, and determining the applied blending ratio based on the calculated plurality of blending ratios.

20. The non-transitory, computer-readable medium according to claim 18, wherein the pixel value combining process further includes acts of:

calculating a long-time exposure pixel value dependent blending ratio $\alpha L$ that is dependent on the pixel value of the long-time exposure pixel, calculating a short-time exposure pixel value dependent blending ratio $\alpha S$ that is dependent on the pixel value of the short-time exposure pixel, determining the product of the calculated long-time exposure pixel value dependent blending ratio $\alpha L$ and the calculated short-time exposure pixel value dependent blending ratio $\alpha S$, that is, $\alpha = \alpha L \times \alpha S,$ the $\alpha$ is determined as the applied blending ratio representing a blending amount of the short-time exposure pixel.

21. The non-transitory, computer-readable medium according to claim 20, wherein the pixel value combining process further includes acts of:

determining the long-time exposure pixel dependent blending ratio $\alpha L$ such that depending on a pixel value CL of a long-time exposure pixel of a color C as a pixel to be blended, $\alpha L=0$ when CL THOL, $\alpha L=(CL-THOL)/(TH1L-THOL)$ when THOL CL TH1L, and $\alpha L=1.0$ when TH1L CL, and determining the short-time exposure pixel dependent blending ratio $\alpha S$ such that depending on a pixel value CS of the short-time exposure pixel of the color C as the pixel to be blended, $\alpha S=0$ when CS THOS, $\alpha L=(CL-THOS)/(TH1S-THOS)$ when THOS CS TH1S, and $\alpha L=1.0$ when TH1S CL, wherein THOL, TH1 L, THOS, and TH1S are predefined threshold values.

22. The non-transitory, computer-readable medium according to claim 18, wherein the pixel value combining process further includes an act of:

calculating a pixel value CW of a color C of the output image or the intermediate image through the following expression $CW = \alpha \times CS \times GAIN + (1.0 - \alpha) \times CL$ where CL is a pixel value of a long-time exposure pixel of the color C, CS is a pixel value of a short-time exposure pixel of the color C, GAIN is an exposure ratio of a long-time exposure pixel and a short-time exposure pixel, and $\alpha$ is the applied blending ratio.

23. The non-transitory, computer-readable medium according to claim 18, wherein the pixel value combining process further includes acts of:

producing the intermediate image by the blending process for the long-time exposure pixel and the short-time exposure pixel to which the applied blending ratio is applied, and producing a final output image by the blending process for pixel values of the same color composing the produced intermediate image.

24. The non-transitory, computer-readable medium according to claim 18, wherein the pixel value combining process further includes acts of:

receiving image data with an RGB array in which the long-time exposure pixel and the short-time exposure pixel are mixed, and determining the pixel values of the output image or the intermediate image by blending the long-time exposure pixel and the short-time exposure pixel whose colors are the same, for each color of RGB.

25. The non-transitory, computer-readable medium according to claim 24, wherein the pixel value combining process further includes an act of:

determining the applied blending ratio by applying only G pixel data of the image data with the RGB array.

* * * * *